(12) United States Patent
Harada

(10) Patent No.: US 9,489,702 B2
(45) Date of Patent: Nov. 8, 2016

(54) INFORMATION PROCESSING DEVICE, DATA PROCESSING METHOD THEREOF, AND PROGRAM

(71) Applicant: NEC Corporation, Tokyo (JP)

(72) Inventor: Hiroo Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/416,370

(22) PCT Filed: Jul. 19, 2013

(86) PCT No.: PCT/JP2013/069623
§ 371 (c)(1),
(2) Date: Jan. 22, 2015

(87) PCT Pub. No.: WO2014/017392
PCT Pub. Date: Jan. 30, 2014

(65) Prior Publication Data
US 2015/0206257 A1     Jul. 23, 2015

(30) Foreign Application Priority Data
Jul. 24, 2012   (JP) .................................. 2012-164130

(51) Int. Cl.
*G06Q 50/12*   (2012.01)
*G06F 3/00*    (2006.01)
(Continued)

(52) U.S. Cl.
CPC .............. *G06Q 50/12* (2013.01); *G06F 3/002* (2013.01); *G06F 3/005* (2013.01); *G06F 3/011* (2013.01);
(Continued)

(58) Field of Classification Search
CPC ........... G06F 17/3082; G06F 17/3079; G06F 3/002; G06F 3/005; G06F 3/011; G06F 17/30784; G06F 17/30256; G06Q 50/12; G06Q 30/0643; G06K 9/46; G06K 9/00671; G06T 11/60; G06T 2210/41
USPC ........................................................ 382/103
See application file for complete search history.

(56) References Cited

U.S. PATENT DOCUMENTS

2012/0300089 A1   11/2012   Sbaiz et al.

FOREIGN PATENT DOCUMENTS

| JP | 2006-85498  | 3/2006 |
| JP | 2006-148618 | 6/2006 |

(Continued)

OTHER PUBLICATIONS

"How to Rent Movies from Redbox", 2002, wikiHow to do anything, Retrieved from Internet on Jun. 10, 2016, retrieved from <URL:http://www.wikihow.com/Rent-Movies-from-Redbox>.*

(Continued)

*Primary Examiner* — Gregory F Cunningham
(74) *Attorney, Agent, or Firm* — Finnegan, Henderson, Farabow, Garrett & Dunner LLP

(57) ABSTRACT

This information processing device (100) comprises: a video data acquisition unit (102) that sequentially acquires video data resulting from at least a portion of an imaging subject presenting a plurality of items being imaged by an imaging unit; an image recognition unit (104) that detects that at least a portion of a pre-registered image is contained in the video data, and recognizes the image; an appended data extraction unit (108) that extracts the respective appended data of each image from an appended data storage unit (106) that stores appended data corresponding to each of a plurality of recognized images; and an appended data display unit (110) that displays the extracted appended data of each image.

18 Claims, 27 Drawing Sheets

(51) Int. Cl.
  *G06F 3/01* (2006.01)
  *G06F 17/30* (2006.01)
  *G06K 9/00* (2006.01)
  *G06Q 30/06* (2012.01)
  *G06K 9/46* (2006.01)
  *G06T 11/60* (2006.01)

(52) U.S. Cl.
  CPC ....... *G06F 17/3079* (2013.01); *G06F 17/3082* (2013.01); *G06F 17/30256* (2013.01); *G06F 17/30784* (2013.01); *G06K 9/00671* (2013.01); *G06K 9/46* (2013.01); *G06Q 30/0643* (2013.01); *G06T 11/60* (2013.01); *G06T 2210/41* (2013.01)

(56) References Cited

FOREIGN PATENT DOCUMENTS

| JP | 2006-148618 A | * | 6/2006 |
| JP | 2006-285654 | | 10/2006 |
| JP | 2006-285971 | | 10/2006 |
| JP | 2008-102942 | | 5/2008 |
| JP | 2010-238118 | * | 10/2010 |
| JP | 2011-81556 | | 4/2011 |
| JP | 2011-170682 | | 9/2011 |
| JP | 2012-507761 | * | 3/2012 |
| WO | WO 2010/073616 A1 | | 7/2010 |
| WO | WO 2012/084362 A1 | | 6/2012 |
| WO | WO 2013/133067 A1 | * | 9/2013 |

OTHER PUBLICATIONS

Japanese Office Action mailed Sep. 13, 2016, by the Japanese Patent Office in counterpart Japanese Patent Application No. 2014-526891.*

International Search Report and Written Opinion mailed Aug. 20, 2013 in corresponding PCT International Application.

Office Action issued by the Japanese Patent Office in counterpart Japanese Patent Application No. 2014-526891, dated Nov. 4, 2015.

Japanese Office Action mailed Jun. 7, 2016, by the Japanese Patent Office in counterpart Japanese Patent Application No. 2014-526891.

* cited by examiner

INFORMATION PROCESSING DEVICE, DATA PROCESSING METHOD THEREOF, AND PROGRAM

CROSS-REFERENCE TO RELATED PATENT APPLICATIONS

This application is a National Stage Entry of International Application No. PCT/JP2013/069623, filed Jul. 19, 2013, which claims priority from Japanese Patent Application No. 2012-164130, filed Jul. 24, 2012. The entire contents of the above-referenced applications are expressly incorporated herein by reference.

TECHNICAL FIELD

The present invention relates to an information processing device, a data processing method thereof, and a program.

BACKGROUND ART

In restaurants of eating-out industry or the like, self-ordering systems are available in which clients themselves can operate a terminal provided on each table of a shop. One example of such a self-ordering system is described in Patent Literature 1. Another example of such a self-ordering system described in Patent Literature 2 enables a user to create ordering information by way of the user's electronic appliance such as a car navigation system and receives the ordering information through wireless communication.

A commodity information retrieval system described in Patent Literature 3 captures, by a terminal, an image of an image reproduced and displayed on an image reproduction device, and uses the imaged image for retrieving the relevant commodity information on a network, thereby enabling a user to order the commodity based on the retrieved commodity information.

CITATION LIST

Patent Literature

PTL 1: Japanese Patent Application Publication No. 2006-285971
PTL 2: Japanese Patent Application Publication No. 2008-102942
PTL 3: Japanese Patent Application Publication No. 2006-285654

Technical Problem

In the technologies described in the above-listed literatures, users have to search for a commodity that they want from a catalogue or the like listing many commodities, and capture the image thereof, which requires pain and effort.

The present invention is made in view of such circumstances, and has an object to provide an information processing device, a data processing method thereof, and a program, with which visibility of the information of a plurality of images on a mobile terminal is improved.

Solution to Problem

An information processing device according to the present invention includes:

a video data acquisition unit that sequentially acquires video data resulting from imaging by means of an imaging unit at least a part of an imaging target showing a plurality of items;

an image recognition unit that detects that the video data contains at least a part of a pre-registered image and recognizes the image;

an appended data extraction unit that extracts, from an appended data storage unit that stores therein pieces of appended data respectively corresponding to the plurality of images shown in the imaging target recognized by the image recognition unit, each piece of appended data corresponding to each of the plurality of images; and an appended data display unit that displays appended data of each image extracted by the appended data extraction unit.

A data processing method for the information processing device in the present invention is such that the information processing device sequentially acquires video data resulting from imaging by means of an imaging unit at least a part of an imaging target showing a plurality of items;

detects that the video data contains at least a part of a pre-registered image and recognizes the image;

extracts, from an appended data storage unit that stores therein pieces of appended data respectively corresponding to the plurality of recognized images shown in the imaging target, each piece of appended data corresponding to each of the plurality of images; and displays extracted appended data of each image.

A program according to the present invention is such that causes a computer serving as an information processing device to execute procedures of:

sequentially acquiring video data resulting from imaging by means of an imaging unit at least a part of an imaging target showing a plurality of items;

detecting that the video data contains at least a part of a pre-registered image and recognizing the image;

extracting, from an appended data storage unit that stores therein pieces of appended data respectively corresponding to the plurality of recognized images shown in the imaging target, each piece of appended data corresponding to each of the plurality of images; and displaying extracted appended data of each image.

It should be noted that any combination of the above-described constituting elements is also an effective embodiment of the present invention, and any representation of the present invention can take any form of a method, an device, and a system, a storage medium, and a computer program which still serves as an effective embodiment of the present invention.

It should be also noted that each one type of constituting elements of the present invention does not have to be independent from each other. In fact, a plurality of constituting elements can be formed into a single member, one constituting element can be formed by a plurality of members, a constituting element can be a part of another constituting element, and a part of a constituting element can overlap a part of another constituting element, and the like.

Furthermore, a data processing method and a computer program of the present invention are such that a plurality of procedures are sequentially described. However, the order of the description should not be construed as limiting the order in which the plurality of procedures are executed. In fact, in practicing the data processing method and the computer program of the present invention, the order of the plurality of procedures can be changed if the change does not cause any substantial problems.

Still more, in the data processing method and the computer program of the present invention, the plurality of procedures do not have to be executed at different timings from each other. In fact, a procedure can happen during execution of another procedure, and a part of all of the executing timing of a procedure can overlap with a part of all of the execution timing of another procedure, and the like.

Advantageous Effects of Invention

The present invention provides an information processing device, a data processing method thereof, and a program, with which visibility of the information of a plurality of images on a mobile terminal is improved.

BRIEF DESCRIPTION OF DRAWINGS

The above-mentioned object, the other objects, and features and advantageous effects are more apparent from the following preferred embodiment(s) and the relevant drawings explained below.

DESCRIPTION OF EMBODIMENTS

Figure 1:
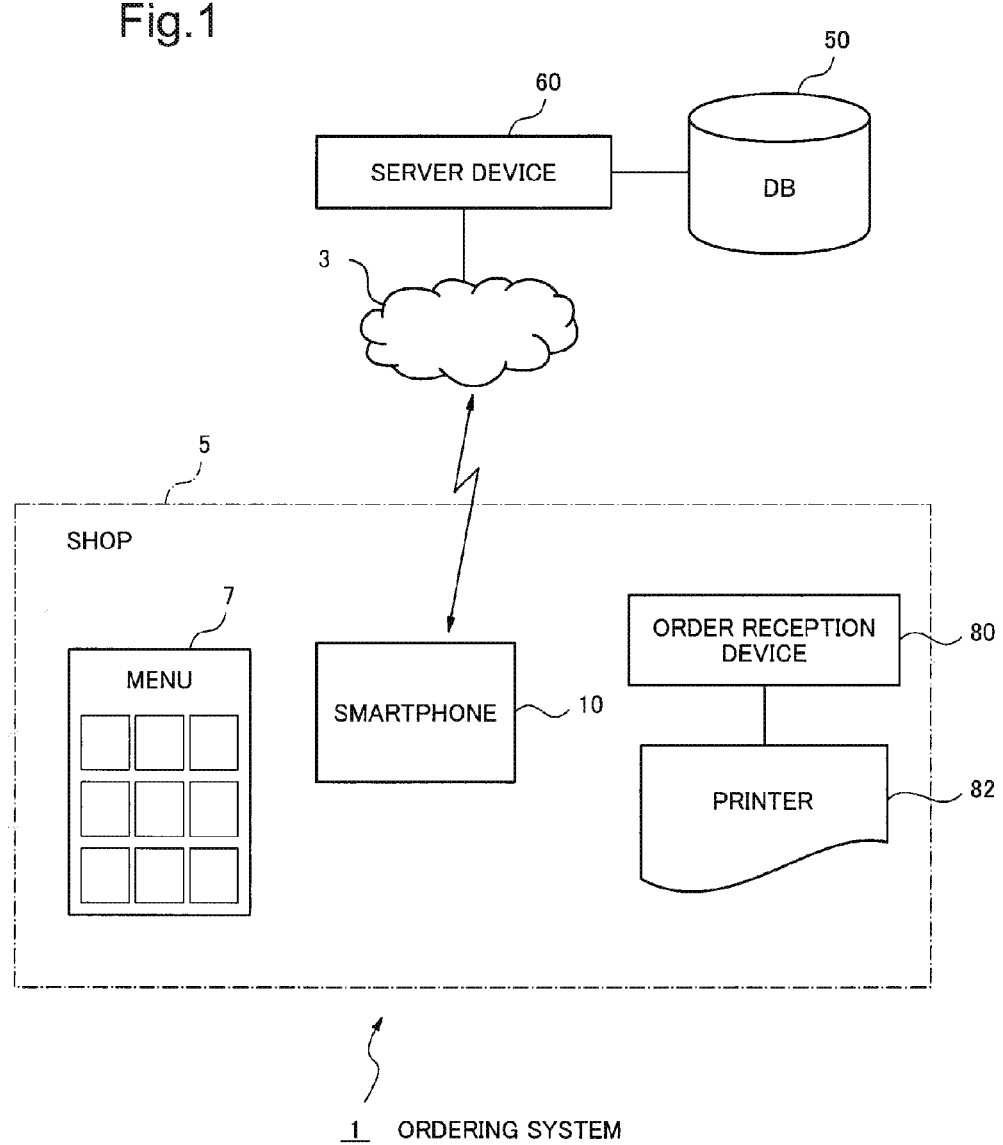
FIG. 1 is a block diagram showing a configuration example of an ordering system which uses an information processing device according to an exemplary embodiment of the present invention.

Hereinafter, exemplary embodiments of the present invention will be described with reference to drawings. It should be noted that the same constituting elements are assigned similar reference numerals throughout the drawings, and the explanation thereof may be omitted where necessary. In addition, in each of the drawings below, the configuration of parts which are not relevant to the substance of the present invention is omitted and not illustrated.

First Exemplary Embodiment

FIG. 1 is a block diagram showing a configuration example of an ordering system 1 which uses an information processing device according to an exemplary embodiment of the present invention.

The ordering system 1 of the present exemplary embodiment includes a smartphone 10 being a mobile terminal used by a user, an order reception device 80 provided in a shop 5, a printer 82 to be connected to the order reception device 80, a server device 60 communicable with the smartphone 10 and the order reception device 80 via a network 3, and a database 50 ("DB" in the drawing) to be connected to the server 60.

Figure 3:
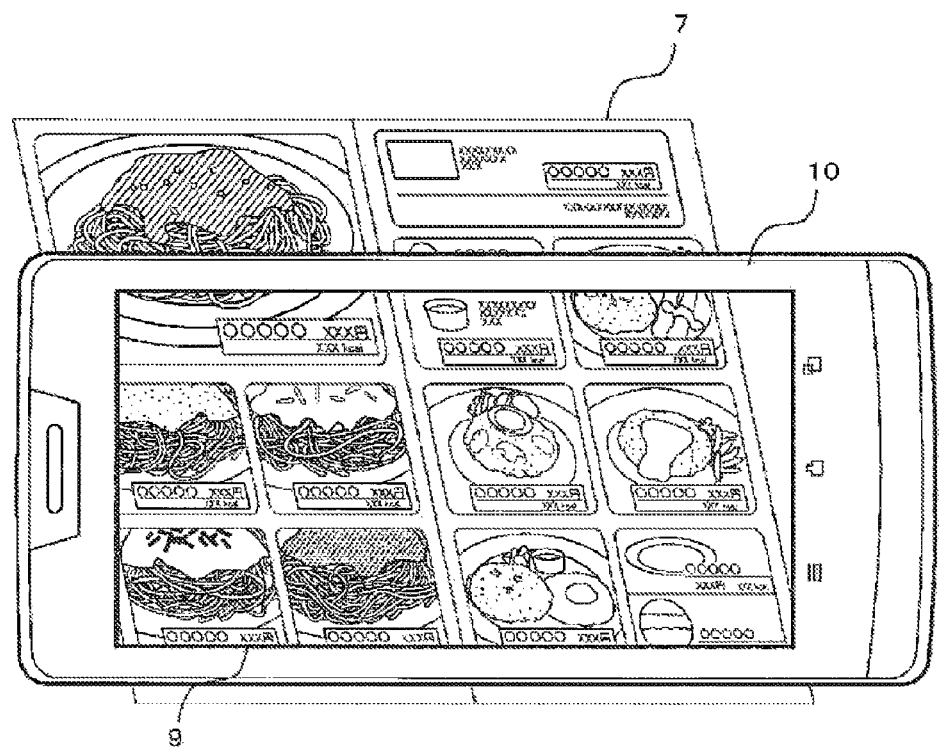
FIG. 3 is a diagram for explaining an order scene in which a smartphone of the information processing device according to the exemplary embodiment of the present invention is used.

As shown in FIG. 3, according to the ordering system 1 according to an exemplary embodiment of the present invention, a user can image a menu 7 by holding a mobile terminal such as a smartphone 10 over the menu 7, and order a commodity on a preview screen 9 of the video displayed real-time. Note that although a case in which the information processing device is used as the ordering system 1 in restaurants or the like in the present exemplary embodiment, the present invention is not limited to this. Any system that recognizes an image from the video data of imaging targets in which a plurality of arbitrary items are displayed and presents appended data related to the image to users can be used as the system according to the present exemplary embodiment.

A smartphone 10 is used as an example of a mobile terminal used by a user in the present embodiment. However, the present invention is not limited to this. For example, the mobile terminal according to the present invention can be, other than s smartphone, a mobile wireless communication terminal such as a mobile telephone, a PDA (Personal Digital Assistants), a tablet terminal, a game appliance, other electronic appliances, and the like. In addition, the mobile terminal according to the present invention can be, other than the mobile terminal carried by a user, a mobile terminal equipped in shops or merchandise exhibition centers or the like, which can be shared by users visiting the shops or merchandise exhibition centers.

The present exemplary embodiment is explained using an example in which a commodity is ordered from the menu 7 in the shop 5 such as a restaurant of eating-out industry. In the present invention, the target to be imaged by a user by holding the smartphone 10 over the target includes, other than the menu 7 and other paper media such as a commodity catalogue, an advertising catalogue, magazine advertisement, a commodity or a commodity model exhibited and displayed on a shop window or a store shelf, a screen of a display of a terminal such as a personal computer displaying a digital commodity catalogue or the like, or commodity information displayed on a digital signage installed on the street or in a shop. In the present exemplary embodiment, the order reception device 80 is installed in a shop. However, the present invention is not limited to this. For example, the order reception means of the present invention can be a virtual shop set up on the server device 60 or an internet shopping site on a website.

The information processing device according to the exemplary embodiments of the present invention can improve visibility of appended information of a plurality of items, especially in such cases as imaging each part of imaging targets composed of the plurality of items arranged next to each other by changing the orientation or position of the camera, and allowing sequential browsing of them on a mobile size screen of a mobile terminal of a user, e.g., smartphone 10 or the like.

The items displayed on the imaging target can include, other than an article for sale, an article not for sale such as a display and a trial piece. The items can further include versions of items such as wasabi-free version of sushi, an option that can add on to constitute an item such as an aero part of an automobile, and a combination of them. The item can also include, other than an article, services provided by various businesses, options of the services, and designated date and time to receive the service, and the item can also be used to name a specific person from whom the user wants to receive service. Still more, the item can be used to present a plurality of alternatives to a user, and to receive one or more any alternatives from the user. Here, the plurality of alternatives may be alternatives of answers of questionnaires and quizzes.

Figure 2:
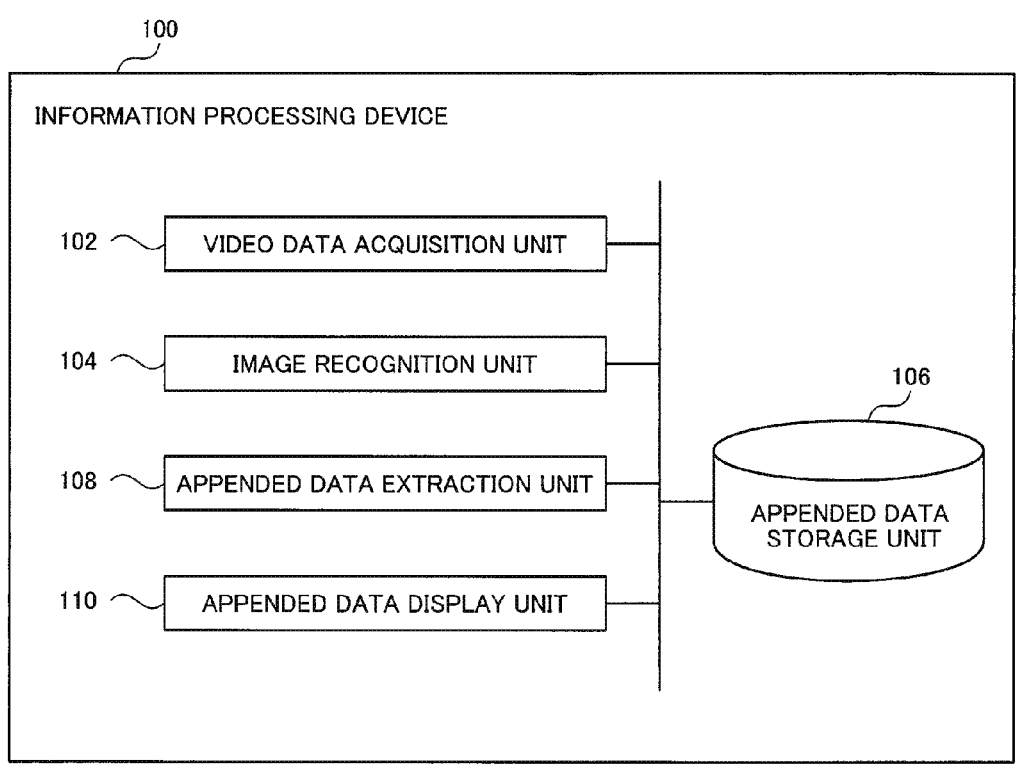
FIG. 2 is a functional block diagram showing a logical configuration of the information processing device according to the exemplary embodiment of the present invention.

FIG. 2 is a functional block diagram showing a logical configuration of an information processing device 100 according to an exemplary embodiment of the present invention.

The information processing device 100 according to the exemplary embodiment of the present invention includes a video data acquisition unit 102 that sequentially acquires video data resulting from imaging by means of an imaging unit at least a part of an imaging target showing a plurality of items, an image recognition unit 104 that detects that the video data contains at least a part of a pre-registered image and recognizes the image, an appended data extraction unit 108 that extracts, from the appended data storage unit 106 storing therein pieces of appended data respectively corresponding to the plurality of images recognized by the image recognition unit 104 shown in the imaging target, each piece of appended data corresponding to each of the plurality of images, and an appended data display unit 110 that displays the appended data of each image extracted by the appended data extraction unit 108.

As described in detail later for each constituting element, the information processing device 100 according to an exemplary embodiment of the present invention may be realized by a user mobile terminal (smartphone 10), the server device 60 communicable with the user mobile terminal (smartphone) 10, or a combination of them.

The smartphone 10 can realize at least a part of the function of the information processing device 100 according to an exemplary embodiment of the present invention on the smartphone 10 by pre-installing an application program for realizing the information processing device 100, or the smartphone 10 can use the function of the information processing device 100 by providing a web page on a web server (not illustrated in the drawings) and allowing a user to access it by means of the smartphone 10.

Figure 4:
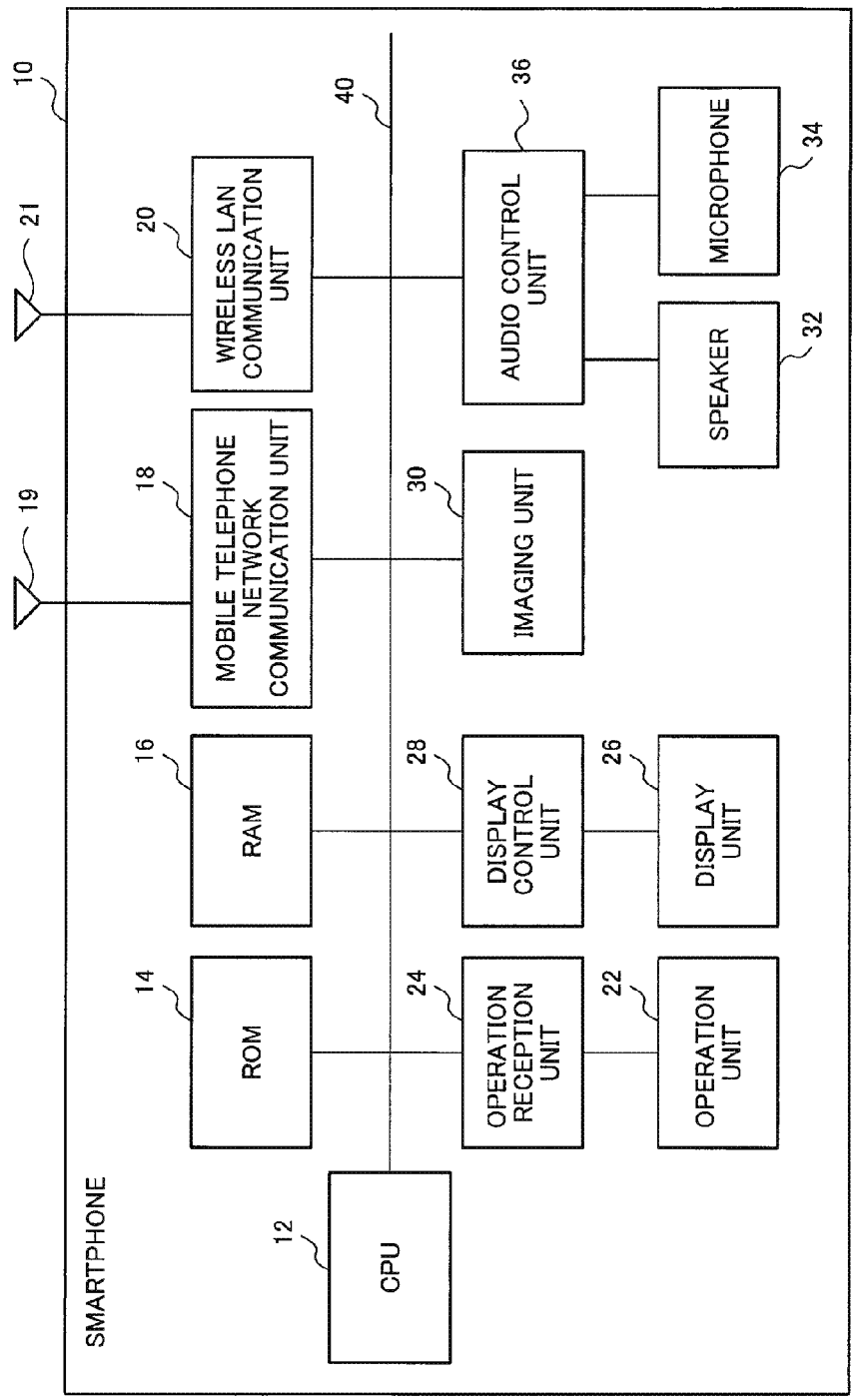
FIG. 4 is a block diagram showing a hardware configuration of a smartphone of the information processing device according to the exemplary embodiment of the present invention.

FIG. 4 is a block diagram showing a hardware configuration of a smartphone 10 realizing the user mobile terminal according to an exemplary embodiment of the present invention. As shown in FIG. 4, the smartphone 10 according to the present exemplary embodiment includes a CPU (Central Processing Unit) 12, a ROM (Read Only Memory) 14, a RAM (Random Access Memory) 16, a mobile telephone network communication unit 18, a wireless LAN (Local Area Network) communication unit 20, an operation unit 22, an operation reception unit 24, a display unit 26, a display control unit 28, an imaging unit 30, a speaker 32, a microphone 34, and an audio control unit 36.

The CPU 12 is connected to each element of the smartphone 10 via a bus 40, and controls the entire smartphone 10 together with each element. The ROM 14 stores therein programs and various types of application programs for operating the smartphone 10, various types of configuration data used during operation of these programs or the like, as well as storing therein user data including address data and various types of contents data. The RAM 16 has an area for temporarily storing data, such as a work area on which a program operates.

Each constituting element of the smartphone 10 is realized by any combination of any computer hardware and software including the above-described CPU 12, RAM 16, a program realizing at least a part of the constituting elements in FIG. 2 loaded on the RAM 16, ROM 14 storing the program, and interfaces for network connection (such as mobile telephone network communication unit 18, wireless LAN communication unit 20). Those skilled in the art can understand that various modifications of the method and device for realizing them can be conceived of. The functional block diagram of each exemplary embodiment described below shows a block in the logical functional unit and not a configuration in the hardware unit.

The above-described ROM 14 and RAM 16 may be other devices such as flash memory and a disk drive, which have a function for storing configuration data, temporarily stored date, user data, or the like, for operating an application program and a program.

The operation unit 22 includes an operation key, an operation button, a switch, a jog dial, a touch pad, a touch panel integrated with a display unit 26, and the like. The operation reception unit 24 receives an operation of the operation unit 22 by a user, and notifies the CPU 12 of the incident. The display unit 26 includes a LED (Light Emitting Diode) display appliance, a liquid crystal display, an organic EL (ElectroLuminescence) display, and the like. The display control unit 28 performs various types of screen display on the display unit 26, in accordance with an instruction from the CPU 12. The audio control unit 36 outputs audio from the speaker 32, and inputs audio from the microphone 34, in accordance with an instruction from the CPU 12.

Through the mobile telephone network communication unit 18 and a mobile telephone network antenna 19, the smartphone 10 performs communication by connecting to a mobile communication network (not illustrated in the drawings) via a base station (not illustrated in the drawings), for example in 3G (3rd Generation; third generation mobile telephone) format. The smartphone 10 can communicate with the server device 60 (FIG. 1) by connecting to the network 3 (FIG. 1) such as the Internet from the mobile communication network.

The wireless LAN communication unit 20 performs wireless LAN communication with a relay device (not illustrated in the drawings) via a wireless LAN antenna 21 and for example in a format compliant with the IEEE 802.11 Standard. In the present exemplary embodiment, the smartphone 10 can perform, using wireless LAN communication unit 20, wireless LAN communication with a relay device installed in a shop 5 and connect to an intra-home network (not illustrated in the drawings), thereby communicating with the order reception device 80 connected to the intra-home network.

Figure 5:
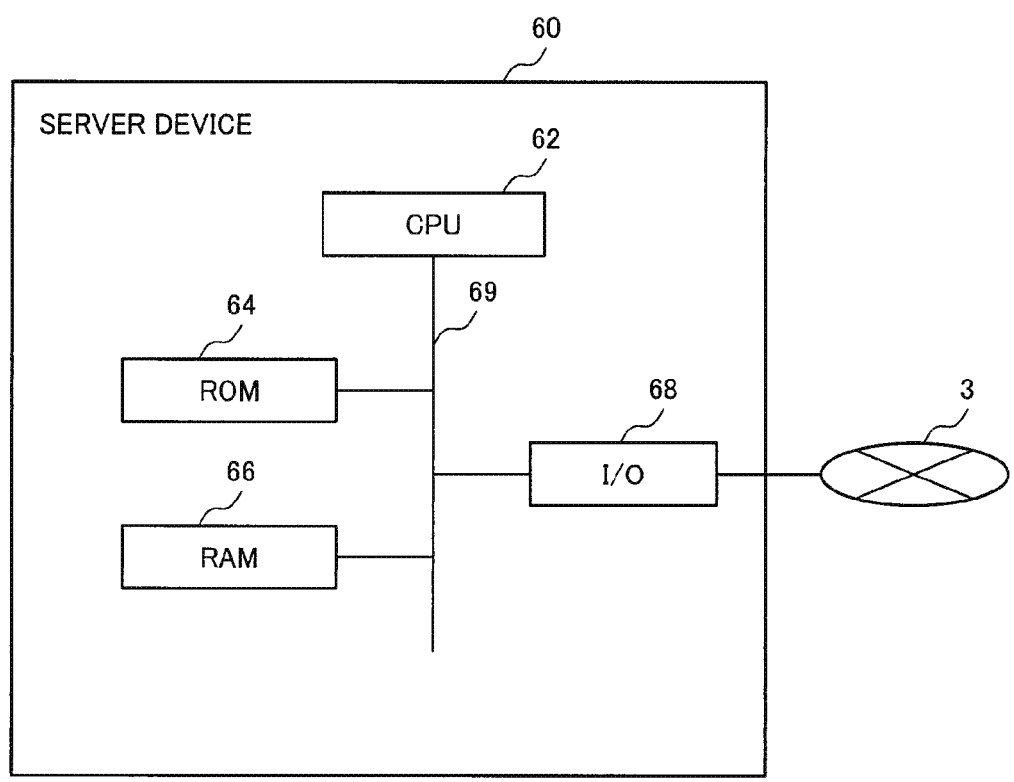
FIG. 5 is a block diagram showing a hardware configuration of a server device of the information processing device according to the exemplary embodiment of the present invention.

FIG. 5 is a block diagram showing a hardware configuration of the server device 60 of the ordering system 1 according to an exemplary embodiment of the present invention.

The server device 60 according to the present exemplary embodiment can be realized by a server computer and a personal computer connected to the database 50 (FIG. 1), or any device corresponding to them. The server device 60 may also be configured by a virtual server or the like.

Each constituting element of the server device 60 of the ordering system 1 of the present exemplary embodiment is realized by any combination of any computer hardware and software including the above-described CPU 62, RAM 66, a program realizing at least a part of the constituting elements in FIG. 2 loaded on the RAM 66, ROM 64 storing the program, and I/O (Input/Output) 68 including interfaces for network connection. The CPU 62 is connected to each element of the server device 60 via a bus 69, and controls the entire server device 60 together with each element. Those skilled in the art can understand that various modifications of the method and device for realizing them can be conceived of. The functional block diagram of each exemplary embodiment described below shows a block in the logical functional unit and not a configuration in the hardware unit. It should be noted that the server device 60 can also be connected to an input/output device not illustrated in the drawings, via the I/O 68.

Returning to FIG. 2, in the information processing device 100 of the present exemplary embodiment, the video data acquisition unit 102 sequentially acquires video data resulting from imaging by means of an imaging unit (the imaging unit 30 of the smartphone 10 in FIG. 4) at least a part of an imaging target showing a plurality of images of commodities. For example, the user holds the smartphone 10 over the menu 7 (FIG. 3), and makes a live-view display of at least a part of the images of the plurality of commodities shown in the menu 7 or the like, on the preview screen 9 (FIG. 3) on the display unit 26 (FIG. 4) of the smartphone 10, as a real-time video.

For example, the video data acquisition unit 102 according to the present exemplary embodiment images at least a part of the imaging target, and sequentially acquires video data in a size displayable on a screen of a mobile terminal size.

In the above-described exemplary embodiment, the video data acquisition unit 102 was explained to have a configuration realized by a camera (imaging unit 30 of FIG. 4 or the like) either incorporated in or connected to the smartphone 10. However, the present invention is not limited to this. In other exemplary embodiments, the video data acquisition unit 102 may be realized by the server device 60. The video data acquired by the video data acquisition unit 102 of the server device 60 may be distributed by streaming to the smartphone 10 of a user, and displayed on the display unit 26 (FIG. 4) of the smartphone 10. In addition, it is possible to remotely operate the server device 60 from the smartphone 10, to distribute by streaming, to the smartphone 10, the video data acquired by the video data acquisition unit 102 of the server device 60, and display the video data on the display unit 26 of the smartphone 10. It is also possible to remotely operate, by means of the smartphone 10, a live camera used as the video data acquisition unit 102 to image a shop window of a shop thereby acquiring video data, to distribute by streaming the acquired video to the smartphone 10 via the server device 60, and to display it on the display unit 26 of the smartphone 10.

The image recognition unit 104 identifies a plurality of commodities included in the video data, from the images of the commodities included in the vide data, and acquires identification information of each of the commodities. For example, the image recognition unit 104 recognizes images of a plurality of commodities from the video data, as well as extracting feature points of the recognized images of commodities. Then, the image recognition unit 104 identifies commodities based on the extracted feature point data of the images. The image recognition unit 104 may preferably be able to identify the plurality of images of commodities simultaneously from the video data. In addition, the image recognition unit 104 identifies the position of the image of the commodity on the video data, on the display screen.

Note that in the present exemplary embodiment, an example to identify a commodity was explained. However in principle, the image recognition unit 104 detects that the video data contains at least a part of a pre-registered image, thereby recognizing the image.

The following two image detection methods are possible.

Figure 27:
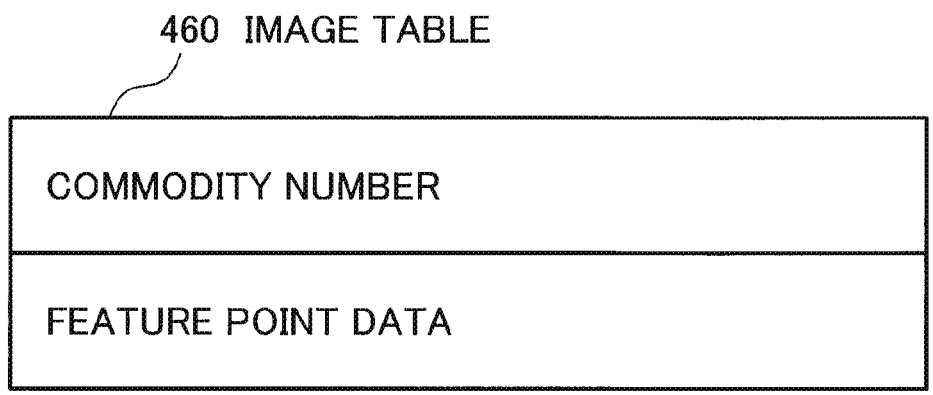
FIG. 27 is a diagram showing an example of a structure of a screen table of an information processing device according to an exemplary embodiment of the present invention.

In the first method, the image recognition unit 104, using pattern recognition or the like, compares the feature amount in the video image with the feature amount (feature point data) of the image of the commodity pre-registered in the image table 460 (FIG. 27), detecting the region at least a part of which matches, and identifying the position of the region and the image, thereby identifying the commodity corresponding to the image.

In the second method, the image recognition unit 104 detects that the video image contains images of a pluralities of commodities using pattern recognition or the like, separates each region supposed to correspond to an image of a separate commodity in the video image, extracts a feature amount for each separated region, compares it with the feature amount (feature point data) in the image table 460 (FIG. 27), and identifies the position of a region at least a part of which has matched and its image, thereby identifying the commodity corresponding to the image.

In the image recognition processing, the feature amount (feature point data) of the image of the commodity in the image table 460 (FIG. 27) does not have to necessarily completely match the feature amount in the video image, and it is sufficient that at least a part of which matches. For example, even when only a part of the image of a commodity is included in the imaging range in the video image, the image recognition unit 104 can still identify the image.

It should be noted that the first method is more preferable because the first method does not necessitate processing to separate the video image to regions for separate commodity images.

In the present exemplary embodiment, the image recognition unit 104 preferably simultaneously identify the plurality of images from the video data. In addition, the image recognition unit 104 identifies the position on the display screen, of the image on the video data.

The image recognition unit 104 can be realized by either the smartphone 10 or the server device 60. The information processing device 100 retains the image table 460 (FIG. 27) in which feature points of images of commodities are associated with identification information of the commodities. For example, the image table 460 can be retained in the database 50 of the server device 60, the ROM 14 of the smartphone 10, or a storage medium mounted on and readable by the smartphone 10 (hereinafter, the ROM 14 and the storage medium of the smartphone 10 are occasionally referred to as "memory of smartphone 10").

In addition, the information processing device according to the present invention may have a configuration in which constituting elements of the image recognition unit 104 are allocated and stored in the smartphone 10 and the server device 60 in any combination.

Specifically, the image recognition unit 104 realizes the following functions, when the image recognition unit 104 performs image detection in the above-described first method:
(a) function to recognize that the imaged image contains a plurality of commodity images,
(b) function to divide separate commodity images in the imaged image,
(c) function to extract feature points of commodity images respectively, and
(d) function to identify a corresponding commodity from the extracted feature point.

The following five ways of allocating functions can be conceived of in the information processing device, for example.
(1) Realize all the functions in the smartphone 10.
(2) Realize the function (a) by the smartphone 10, send the result to the server device 60, and realize the functions (b)-(d) by the server device 60.
(3) Realize the functions (a)-(b) by the smartphone 10, send the result to the server device 60, and realize the functions (c)-(d) by the server device 60.
(4) Realize the functions (a)-(c) by the smartphone 10, send the result to the server device 60, and realize the function (d) by the server device 60.
(5) Realize all the functions in the server device 60.

When the image recognition unit 104 performs image detection in the above-described second method, the image recognition unit 104 realizes the following functions:
(e) function to extract feature points from the imaged image,
(f) function to compare the extracted feature points, to the feature point data for each pre-registered commodity image,
(g) function to identify a position of a commodity image included in the imaged image and a type of the commodity, from the comparison result.

The following four ways of allocating functions can be conceived of in the information processing device, for example.
(1) Realize all the functions in the smartphone 10.
(2) Realize the function (e) by the smartphone 10, send the result to the server device 60, and realize the functions (f)-(g) by the server device 60.
(3) Realize the functions (e)-(f) by the smartphone 10, send the result to the server device 60, and realize the functions (g) by the server device 60.
(4) Realize all the functions in the server device 60.

In such a pattern as distributing by streaming video data imaged by the server device 60 to the smartphone 10 to be displayed on the smartphone 10, a configuration in which the smartphone 10 and the server device 60 in the specific examples described above are exchanged can also be possible.

In the image table 460, the commodity number being identification information of the commodity is stored in association with the feature point data of the image of the commodity. The image recognition unit 104 can acquire identification information of the commodity corresponding to the feature point of the image of the commodity extracted from the video data, by referring to the image table 460.

In addition, the image table 460 may retain feature point data of an image and its corresponding appended data in association with each other. In turn, a configuration is possible in which the image recognition unit 104 or the appended data extraction unit 108 can extract appended data corresponding to feature point data of the image by referring to the image table 460, without performing processing (Step S107 in FIG. 7 or the like explained later) to extract appended data by referring to the commodity master 430 (refer to later explained FIG. 24).

Figure 24:
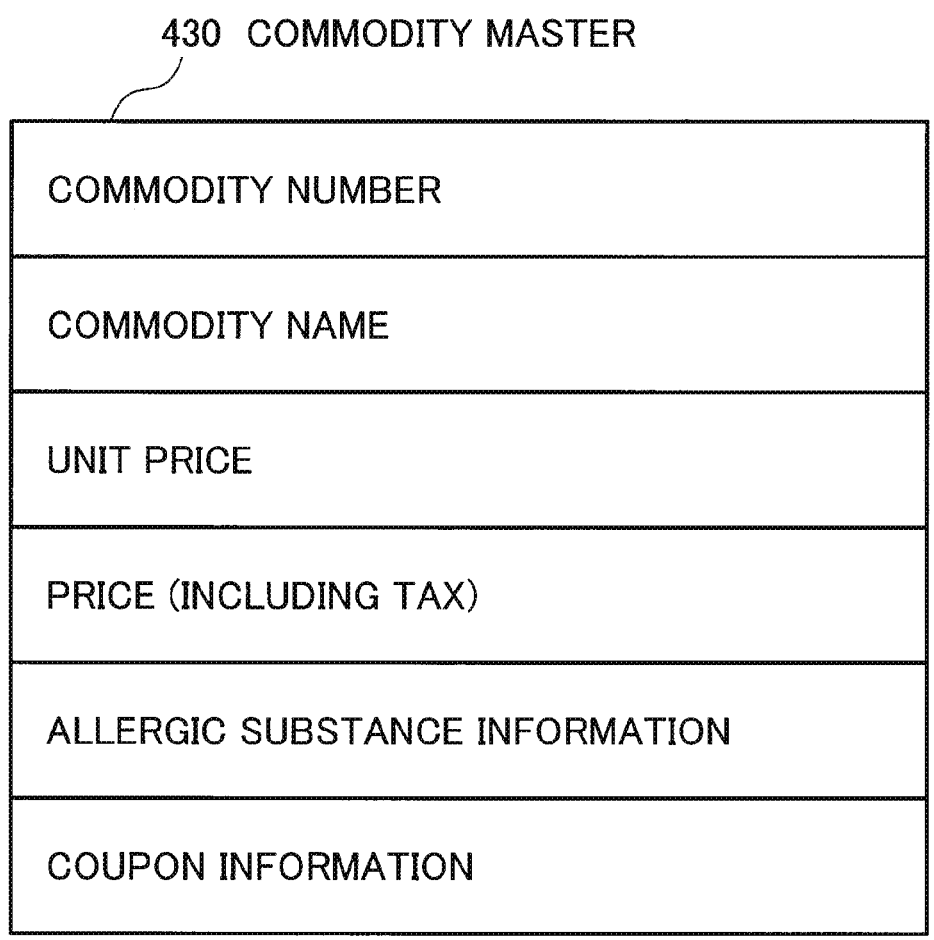
FIG. 24 is a diagram showing an example of a structure of a commodity master of an information processing device according to an exemplary embodiment of the present invention.

The appended data storage unit 106 stores appended data corresponding to each of a plurality of images shown in an imaging target. In the present exemplary embodiment, such a commodity master 430 as shown in FIG. 24 is retained in the database 50 of the server device 60. For example, the commodity master 430 can include a commodity number being identification information of a commodity, a name of the commodity, a unit price of the commodity, sales price including tax, allergic substance information of materials contained in an article of food being the commodity, coupon information related to the commodity, or the like.

The present exemplary embodiment assumes a configuration in which the appended data storage unit 106 is included in the database 50 of the server device 60. However, the appended data storage unit 106 may be included in a memory of the smartphone 10. In addition, a configuration is also possible in which update information of the appended data is transmitted from the server device 60 to the smartphone 10, and the information processing device 100 can update the appended data retained by the smartphone 10. Another configuration of the information processing device 100 is also possible in which a user selectively downloads necessary appended data to the smartphone 10 from the server device 60, to be stored in the appended data storage unit 106.

The appended data extraction unit 108 extracts appended data of each commodity identified by the image recognition unit 104, from the appended data storage unit 106, based on the identification information of the commodity acquired by the image recognition unit 104. As stated above, the appended data storage unit 106 may be included in both of the smartphone 10 and the server device 60, and the appended data extraction unit 108 may acquire the appended data by accessing the server device 60, for example when no appended data of the commodity is extracted after searching in the appended data storage unit 106 in the smartphone 10, The appended data display unit 110 displays appended data of each commodity extracted by the appended data extraction unit 108, in a position corresponding to the commodity in the video data. The appended data display unit 110 displays, on the video data, appended data of a commodity, by representing it by each type of objects such as icon, balloon or pop up window containing texts, replaced image, or the like.

In a configuration to detect and recognize images included in video data, such as in the above-described second image detection method, the appended data storage unit 106 can store appended data corresponding to each of a plurality of images, and the appended data extraction unit 108 can extract appended data corresponding to each image from the appended data storage unit 106. Then, the appended data display unit 110 displays the appended data of each image in a position corresponding to the image in the video data.

In addition, the appended data display unit 110 may have a configuration of displaying appended data in a determined position in the screen or on the entire screen, regardless of the position corresponding to each image of the video data.

For example, the image recognition unit 104, the appended data extraction unit 108, and the appended data display unit 110 may be realized by a technology called augmented reality (AR) that can add and display information in the real environment imaged by a camera or the like, using a computer. By using AR, the information processing device 100 can even recognize a third dimensional coordinate system of a XY plane of a region on which a pre-registered specific image such as a commodity image is displayed on the video imaged by a camera such as the smartphone 10, and display the corresponding appended data on the display unit 26 as a 3D object for example.

The appended data to be displayed may include, regarding the image, recommendation information, discount information, coupon information, calorie, raw material (allergy information), a URL address of a homepage on which detailed information of a commodity is posted, reputation information of a commodity, rating by customers and critics, optional service information, or the like. In addition, the appended data may include, as shop specific information, a local menu, chef's special menu, points earned by visiting in a limited time period, sold-out commodity information, and the like. In addition, the appended data may include, related to time and date or weather, today's special information, information on time-limited sate (limited to a day of week, a week, a month), seasonal sale, rainy day sale, etc. Still further, the appended data may include basic data of the commodity such as the name and the price of the commodity.

The appended data may further be any combination of such data as listed in the above examples.

The appended data displayed in the video data may be an icon indicating that the appended data exists. The appended data display unit 110 may display detailed information of a commodity, upon reception of an operation of the icon. In other words, the appended data display unit 110 can display appended data of a commodity that was not able to be printed in the commodity catalogue or the like. In this manner, the information processing device 100 can only post minimum necessary information or information of a commodity that can attract attention of users on the imaging target, while presenting detailed information only for commodities that the user has shown interest, which can lead to more effective advertisement and promotion.

Figure 28:
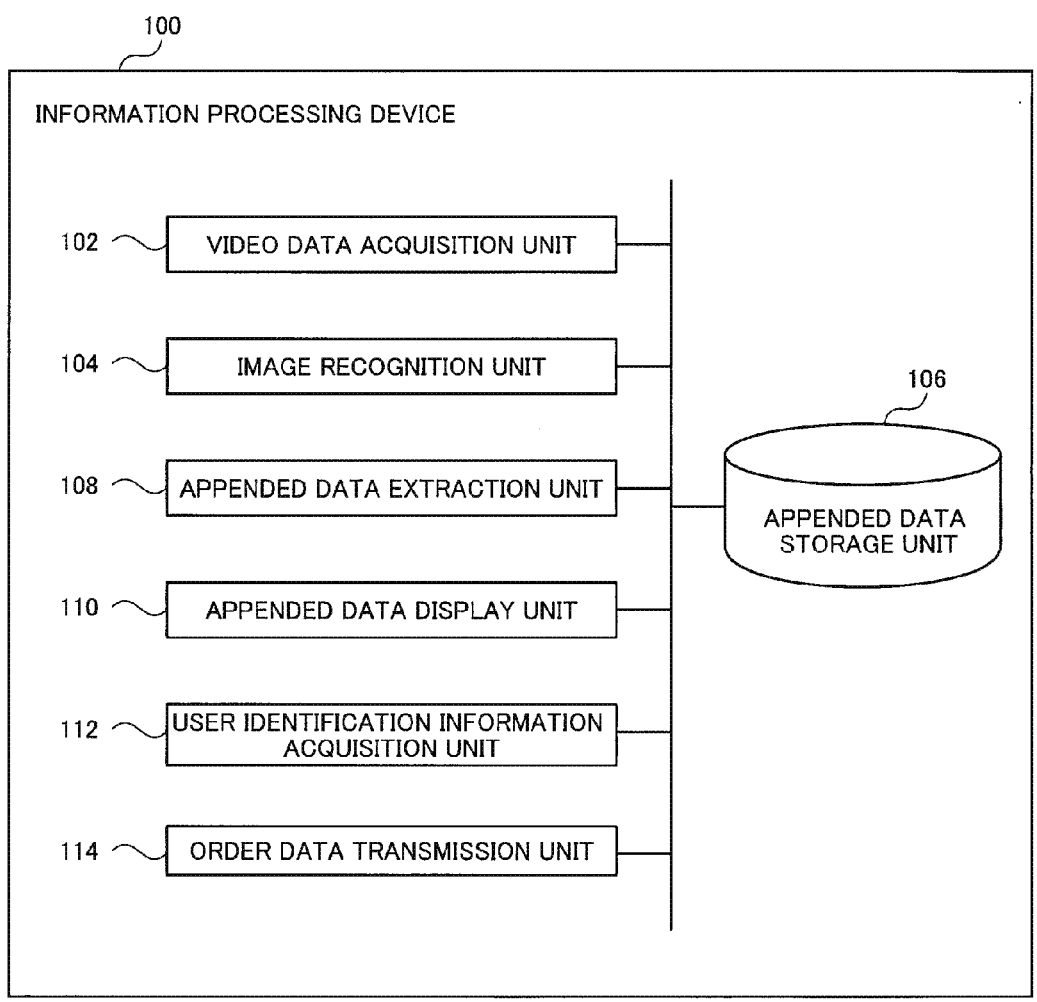
FIG. 28 is a functional block diagram showing an example of a logical configuration of an information processing device according to an exemplary embodiment of the present invention.

It should be noted that the information processing device 100 of the ordering system 1 of the present exemplary embodiment further includes, a user identification information acquisition unit 112 and an order data transmission unit 114, as shown in FIG. 28.

Figure 11:
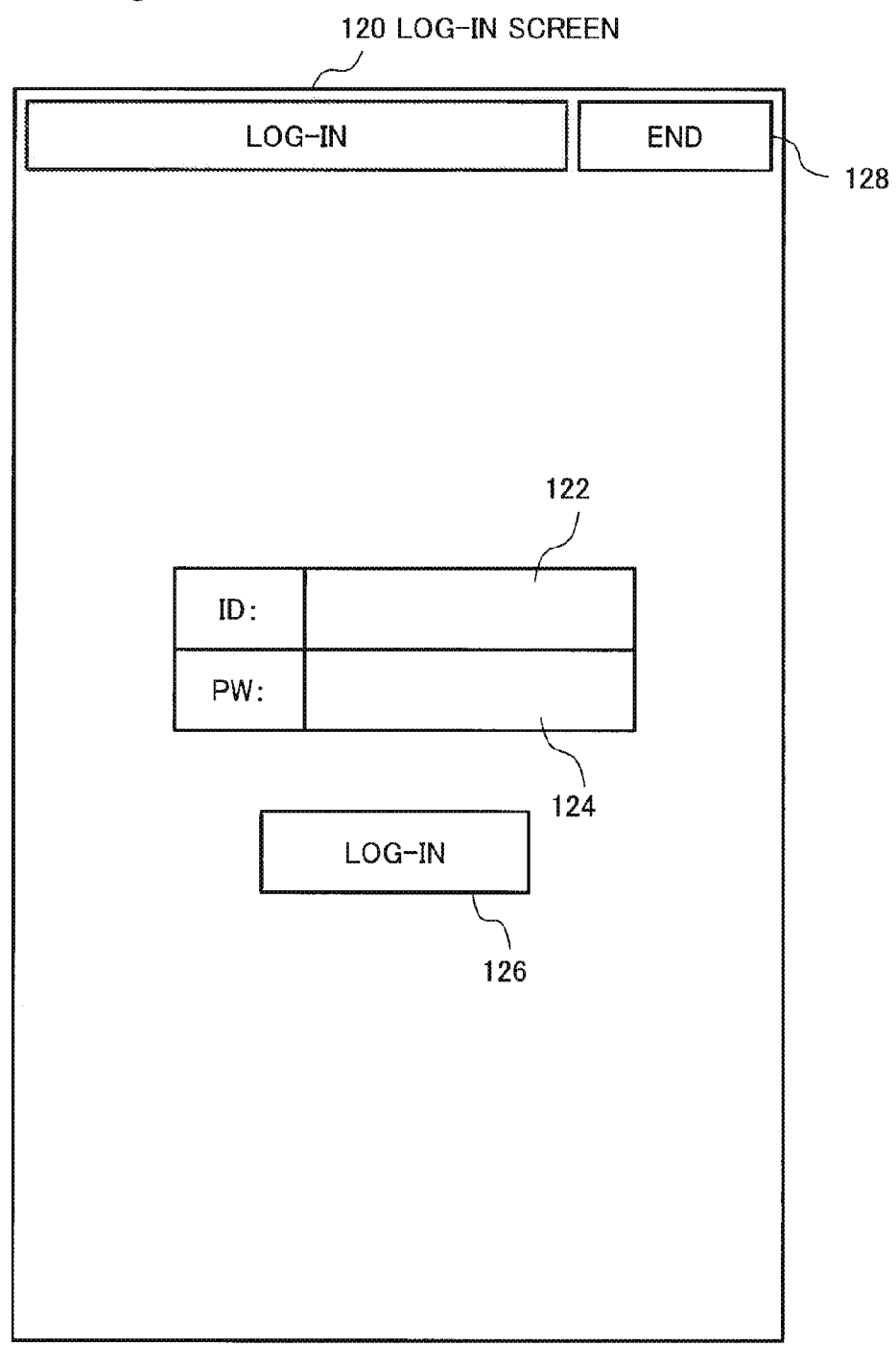
FIG. 11 is a diagram showing a log-in screen of the information processing device according to the exemplary embodiment of the present invention.

The user identification information acquisition unit 112 acquires identification information of a user. For example, identification information of a user may be displayed on the log-in screen 120 as shown in FIG. 11, after activating the application for realizing the information processing device 100 of the present invention on the smartphone 10. The user identification information acquisition unit 112 may acquire identification information of a user, by receiving a pre-registered user ID and a password (PW) on the log-in screen 120. Alternatively, the user identification information acquisition unit 112 may read to acquire terminal identification information individually assigned to the main body of the user mobile terminal.

The order data transmission unit 114 transmits order data including identification information of the commodity selected from the plurality of commodities included in the video displayed on the display unit 26 of a mobile terminal size based on the composite video data acquired by the appended data display unit 110, and the identification information of the user.

It should be noted that the identification information of a commodity and user identification information are not always necessary, and it is sufficient that the order data transmission unit 114 transmit at least selected image data.

Here, a user can select a commodity that he wants to order, by operating the touch panel (operation unit 22 of FIG. 4), from among a plurality of commodities contained in the video displayed on the display unit 26 (FIG. 4) of the smartphone 10, for example. The selection operation can be received by the operation reception unit 24 of the smartphone 10 of FIG. 4. For example, the operation button for ordering may be displayed next to the commodity image, and the user can easily order the commodity by pushing the operation button.

A user performs imaging by orienting the imaging unit 30 towards at least a portion of the imaging target posting many commodities such as a commodity catalogue or the menu 7, displays the images of the plurality of commodities on the display unit 26 of a mobile size of the smartphone 10, and selects a commodity among them. For example, a user can confirm appended data displayed on a real-time video displayed on the display unit 26 while panning the imaging unit 30 of the smartphone 10 in the range of the imaging target, as well as confirm the commodities in the entire imaging target, to select a commodity among them. Especially when selecting and ordering a commodity from the imaging target such as a catalogue or a menu displaying a list of images of a plurality of commodities, the information processing device 100 of the present invention can display the appended data thereby emphasizing the commodity to be appealed to the user the most and catches the attention of the user, for example.

The information processing device 100 according to the present exemplary embodiment may further include a confirmation reception unit (not illustrated in the drawings) that temporarily stores in a storage unit (tray) information of a plurality of images (order of commodity) selected by the order data transmission unit 114, presents the stored order to the user, and receives his confirmation operation. The order data transmission unit 114 transmits information of a plurality of images (order) after receiving the confirmation operation at the confirmation reception unit. In other words, after receiving orders of a plurality of commodities (image), the order data transmission unit 114 can collectively transmit the orders (information of image) in the tray.

When the order data transmission unit 114 is realized by the smartphone 10, the order data is transmitted from the smartphone 10 to the order reception device 80 (FIG. 1), for example. Then, the order reception device 80 can print out order data from the printer 82 (FIG. 1) installed in the kitchen of the shop 5 or the like. By printing out the order data, the order of the user will be automatically conveyed to the kitchen from the smartphone 10. For example, the order data transmission unit 114 can use the wireless LAN communication unit 20 of the smartphone 10 in FIG. 4, to transmit the order data to the order reception device 80 via the relay terminal installed in the shop 5.

The order data transmission unit 114 can also be realized by the server device 60. For example, the order data transmission unit 114 may transmit the order data ordered through the smartphone 10 to the server device 60, and from the server device 60 to the order reception device 80. For example, the order data transmission unit 114 can use the mobile telephone network communication unit 18 of the smartphone 10 shown in FIG. 4 to upload the order data to the server device 60. Then, the order data transmission unit 114 can transmit the order data via the network 3 from the server device 60 to the order reception device 80.

It should be noted that the network 3 between the server device 60 and the order reception device 80 is not particularly limited.

In the information processing device 100 according to the present exemplary embodiment, each type of unit described above can be realized as each type of function, by the CPU of the server device 60 and the smartphone 10 executing each type of processing operation corresponding to a computer program.

A computer program according to the present exemplary embodiment is described to make a computer for realizing the information processing device 100 perform procedures of: sequentially acquiring video data resulting from imaging by means of an imaging unit at least a part of an imaging target showing a plurality of items; detecting that the video data contains at least a part of a pre-registered image and recognizing the image; extracting, from an appended data storage unit that stores therein pieces of appended data respectively corresponding to the plurality of recognized images shown in the imaging target, each piece of appended data corresponding to each of the plurality of images; and displaying extracted appended data of each image.

The computer program according to the present exemplary embodiment can be stored in a storage medium readable by a computer. The storage medium is not particularly limited, and can take various forms. In addition, the program may be loaded onto the memory of the computer from the storage medium, or downloaded to the computer through the network, to be loaded onto the memory.

Figure 10:
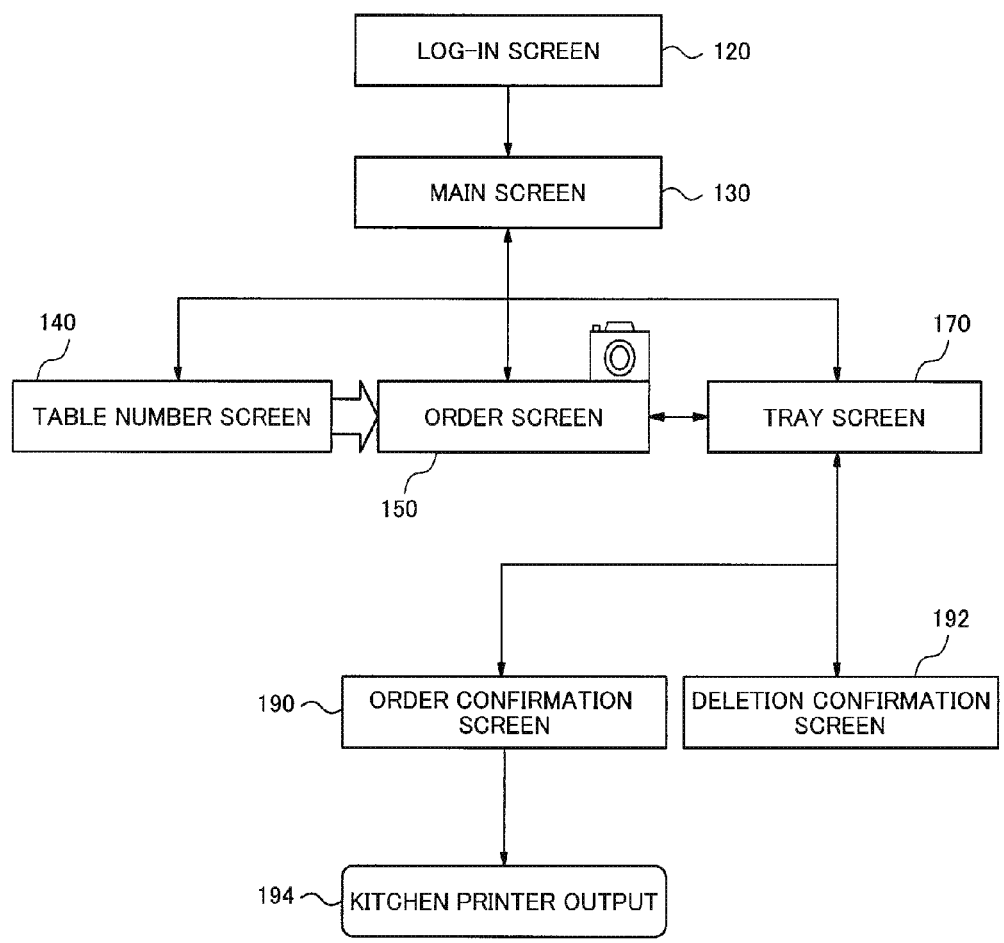
FIG. 10 is a diagram showing an example of a screen configuration of the information processing device according to the exemplary embodiment of the present invention.

FIG. 10 is a diagram showing an example of a screen configuration of a smartphone 10 of an information processing device 100 according to an exemplary embodiment of the present invention.

The screen configuration of the information processing device 100 includes a log-in screen 120, a main screen 130, a table number screen 140, an order screen 150, a tray screen 170, an order confirmation screen 190, and a deletion confirmation screen 192.

Figure 16:
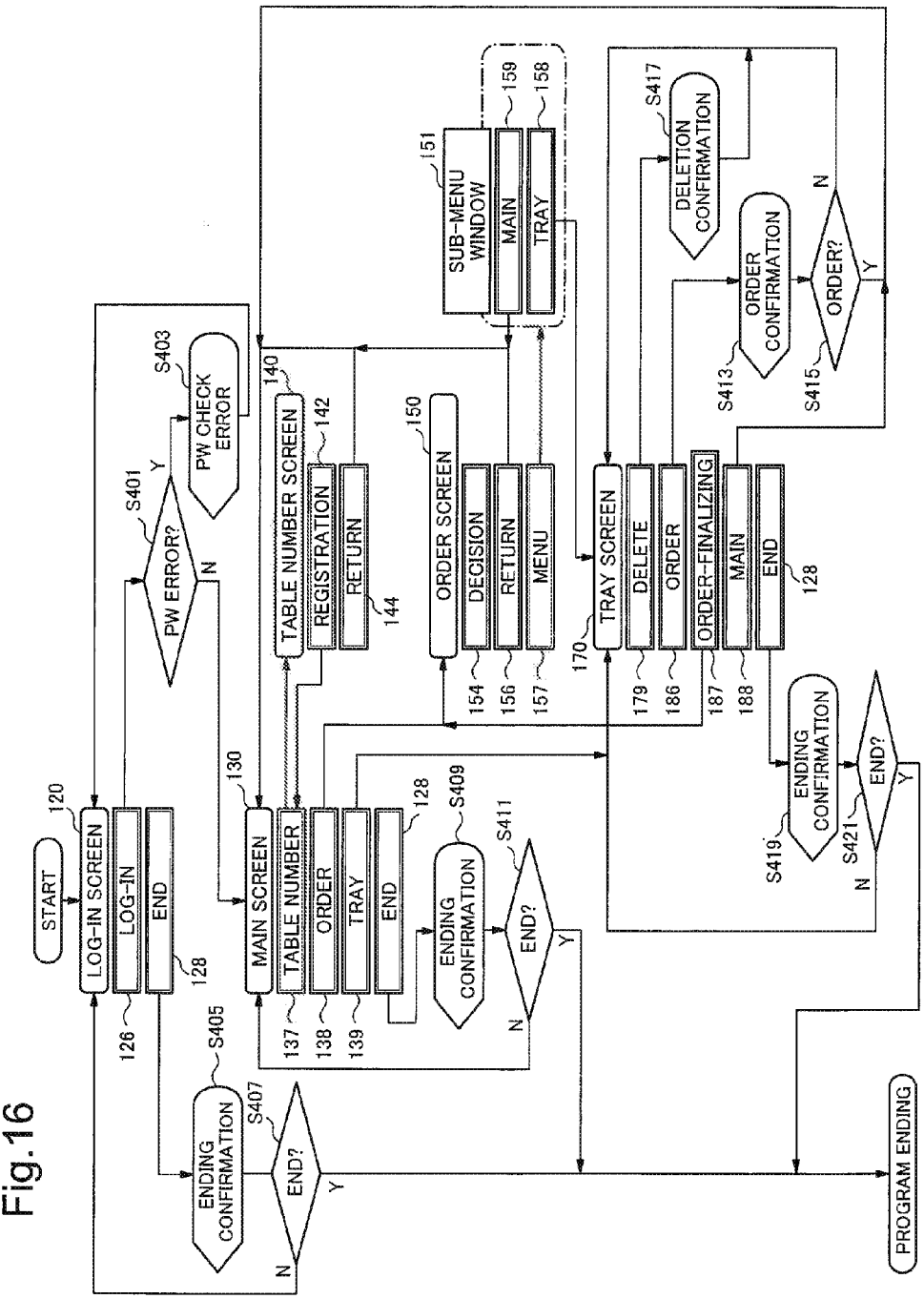
FIG. 16 is a diagram showing an example of a screen flow of the information processing device according to the exemplary embodiment of the present invention.

These screens are switched according to the flow shown in FIG. 16.

The flow in FIG. 16 starts upon activation of the application of the information processing device 100 according to the present exemplary embodiment on the smartphone 10.

First, the log-in screen 120 is displayed on the display unit 26 (FIG. 4) of the smartphone 10. As shown in FIG. 11, the log-in screen 120 includes a user ID input column 122, a password input column 124, a log-in button 126, and an end button 128. By a user inputting the pre-registered user ID and password to the user ID input column 122 and the password input column 124 of the log-in screen 120, and pushing the log-in button 126, the display screen transitions to the main screen 130. During this process, the password is verified through the user authentication process (Step S401), and if it results in an error (Y in Step S401), a message indicating that the password is an error is displayed (Step S403), and the display screen returns to the log-in screen 120. When the password has been authenticated (N in Step S401), the display screen transitions to the main screen 130.

The above-mentioned user authentication process can be performed in the server device 60. The server device 60 retains the user master 400 shown in FIG. 22 in the database 50. The server device 60 can perform the user authentication process by referring to the user master 400.

When the end button 128 is pushed on the log-in screen 120, a message for end conformation is displayed (Step S405). When the end confirmation is received (Y in Step S407), the present application is ended. When the ending is cancelled (N in Step S407), the display screen returns to the log-in screen 120.

Figure 12:
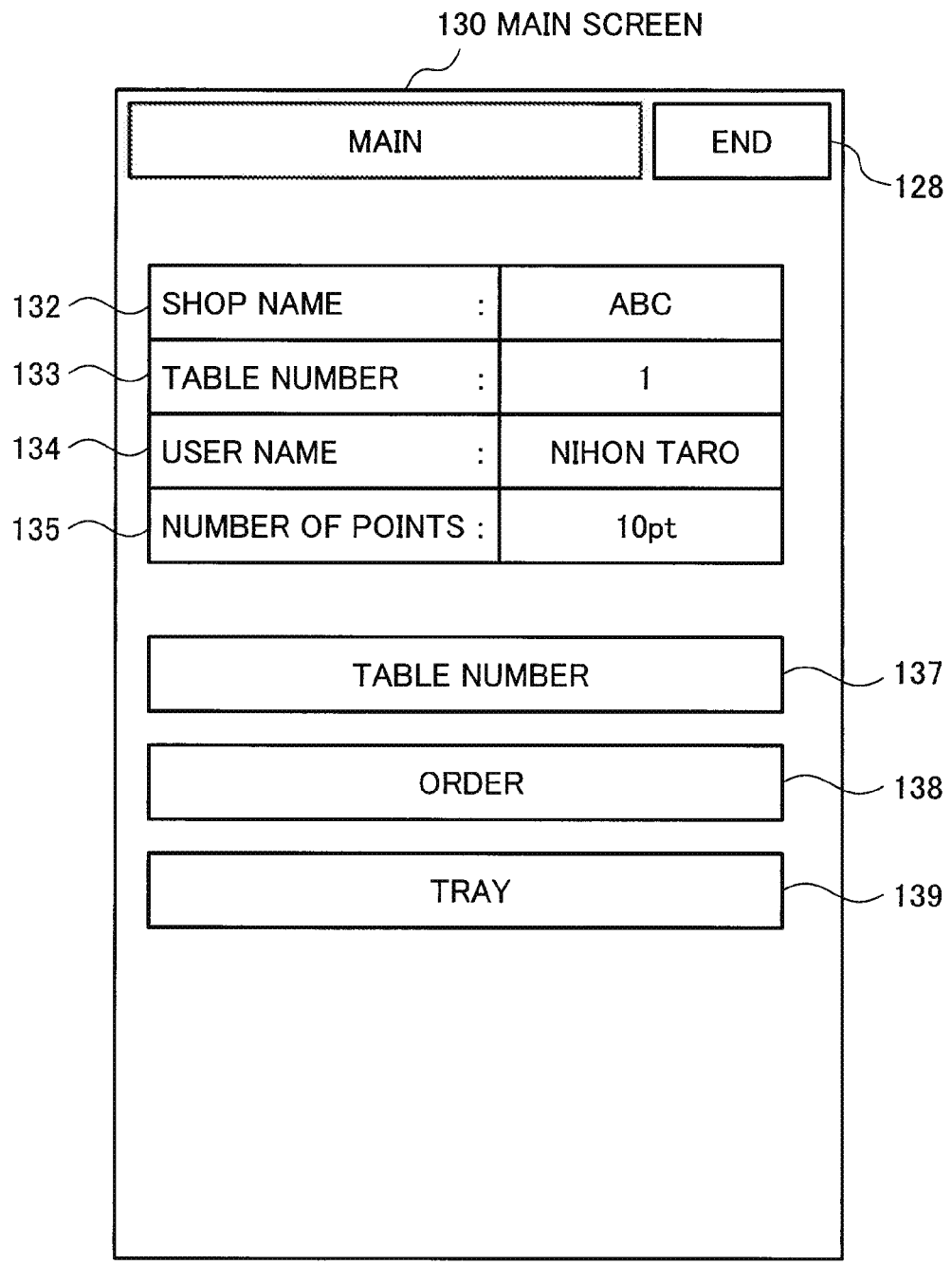
FIG. 12 is a diagram showing a main screen of the information processing device according to the exemplary embodiment of the present invention.

As shown in FIG. 12, the main screen 130 includes a shop name display unit 132, a table number display unit 133, a user name display unit 134, a number of points display unit 135, a table number button 137, an order button 138, a tray button 139, and an end button 128.

Figure 22:
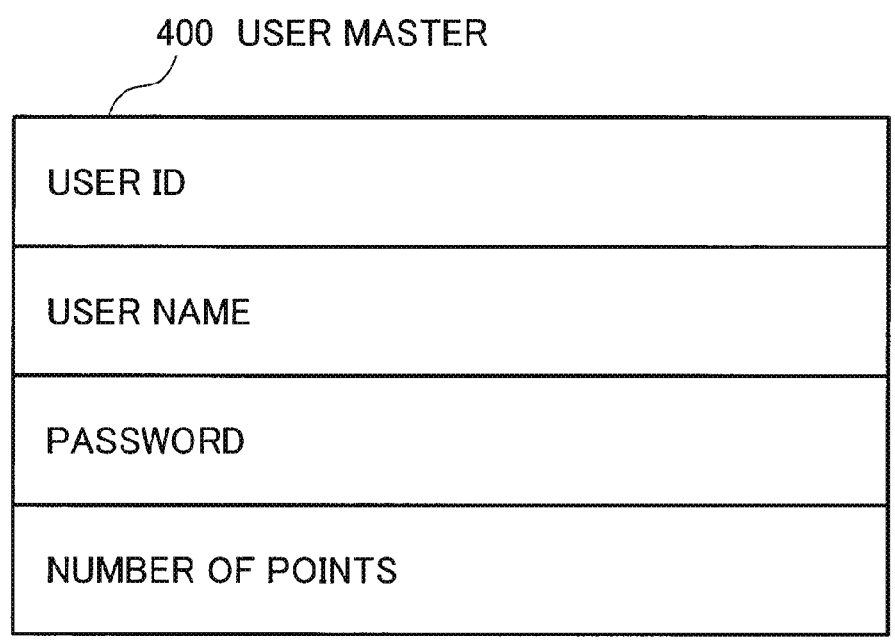
FIG. 22 is an example showing an example of a structure of a user master of an information processing device according to an exemplary embodiment of the present invention.
Figure 23:
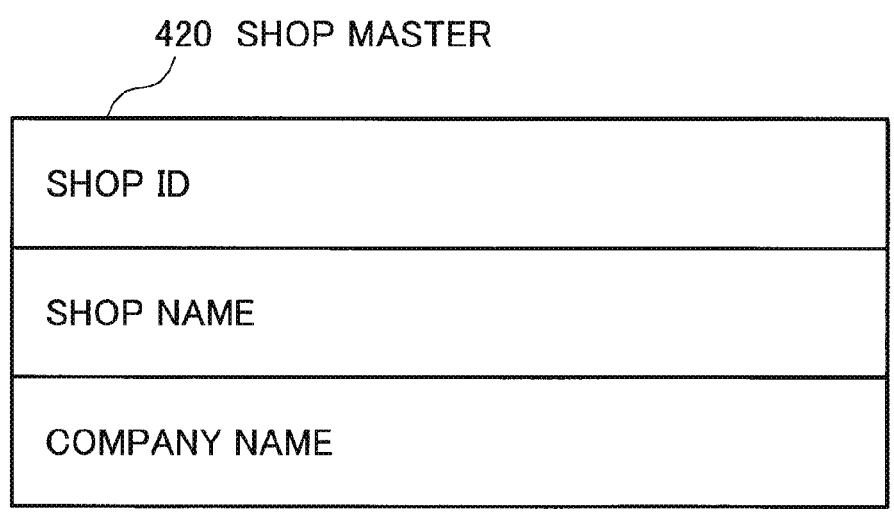
FIG. 23 is a diagram showing an example of a structure of a shop master of an information processing device according to an exemplary embodiment of the present invention.

Each information in the shop name display unit 132, the user name display unit 134, and the number of points display unit 135 on the main screen 130 can be displayed by referring to the user master 400 in FIG. 22, the shop master 420 in FIG. 23, or the like retained in the database 50 of the server device 60.

In addition, it is also possible that, by push of the table number button 137 of the main screen 130, the display screen transition to the table number screen 140, and after receiving designation of a table number by push of the register button 142 of the table number screen 140, the display screen be returned to the main screen 130, and information of the table number display unit 133 be displayed.

Next, as shown in FIG. 16, when the push of the order button 138 is received, the display screen transitions to the order screen 150. In addition, when the return button 144 is pushed on the table number screen 140, the display screen returns to the main screen 130.

When the end button 128 on the main screen 130 is pushed, the end confirmation message is displayed (Step S409). When the end confirmation is received (Yes in Step S411), the present application is ended. When the ending is cancelled (N in Step S411), the display screen returns to the main screen 130.

Figure 13:
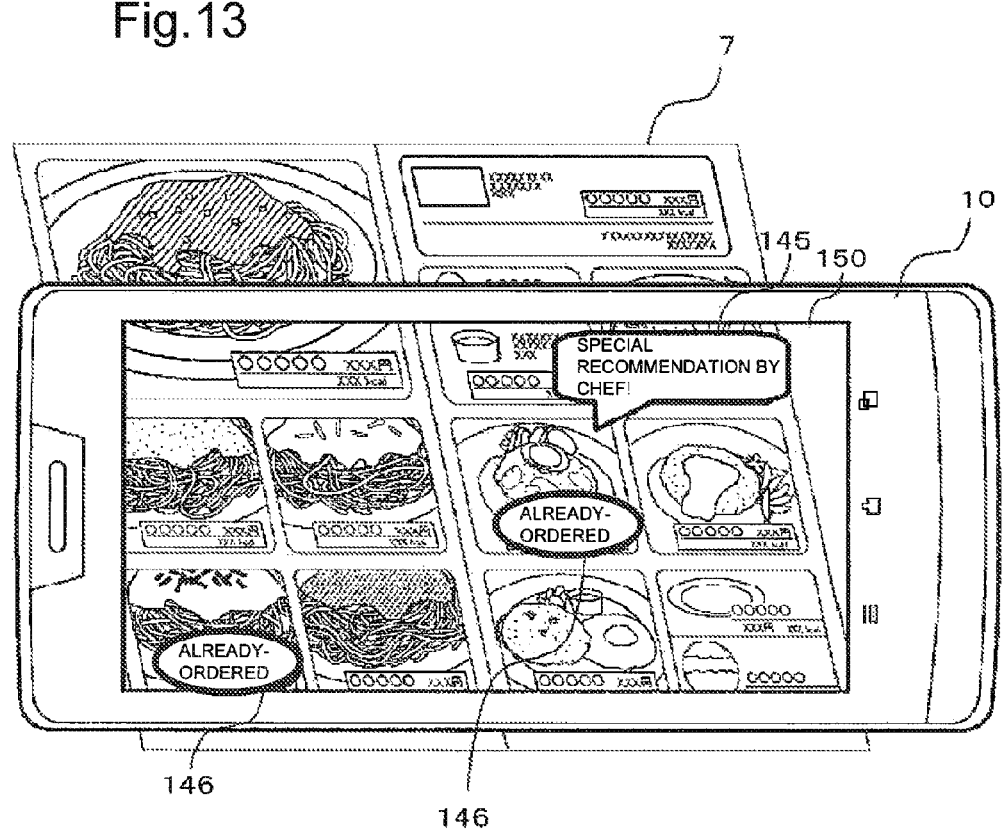
FIG. 13 is a diagram showing an example of an order screen of the information processing device according to the exemplary embodiment of the present invention.

FIG. 13 is a diagram showing an example of an order screen 150 when the smartphone 10 is held over the menu 7. The order screen 150 displays, in a balloon 145, appended data such as a chef's special menu, having been acquired by recognizing the images of the plurality of commodities included in the video of the menu 7. In addition, an already-ordered mark 146 is assigned to the commodity regarding which the order operation has been finished. For example, the amount of order may be displayed here. When the order of the commodity has been fixed, for which coupon information is displayed as appended data, the server device 60 can perform coupon issuance processing to the user.

Figure 14:
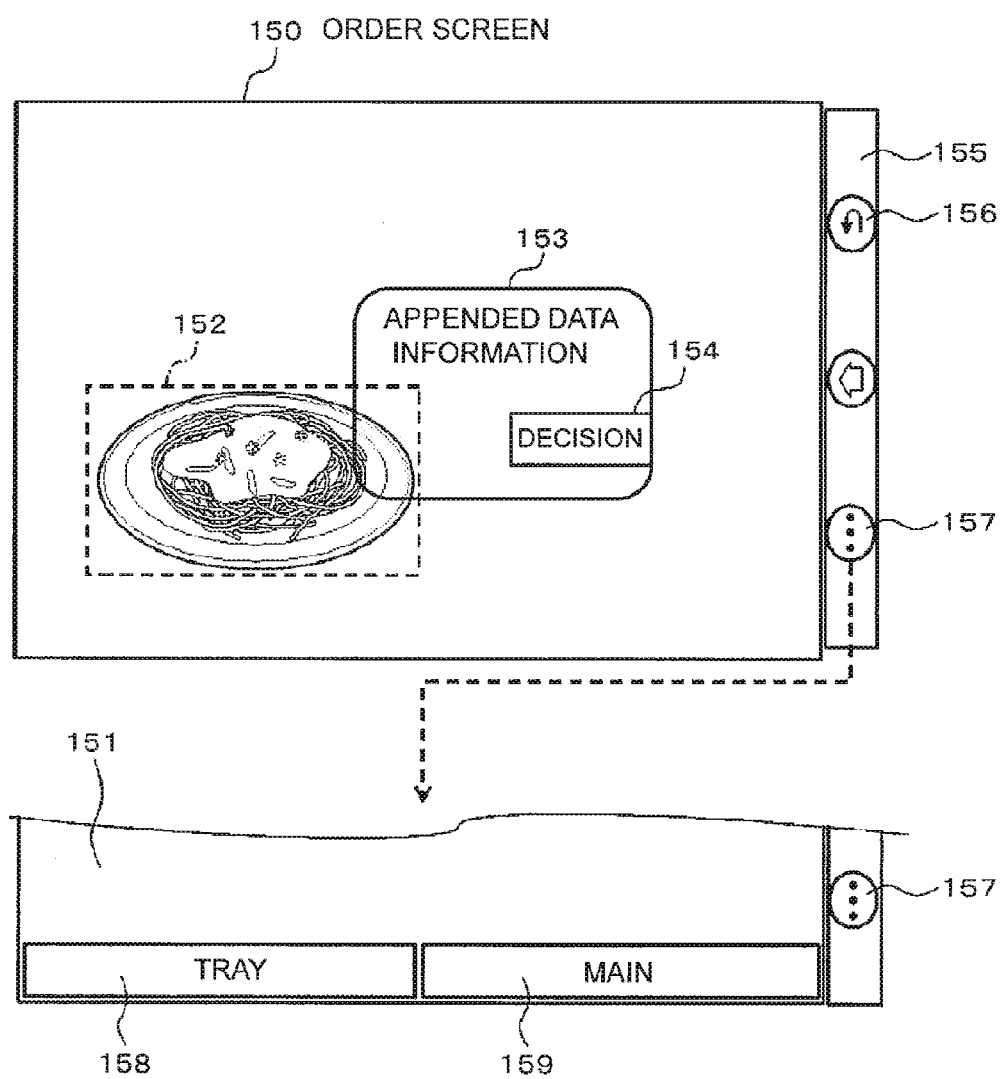
FIG. 14 is a diagram showing an example of an order screen of the information processing device according to the exemplary embodiment of the present invention.

In addition, as shown in FIG. 14, the order screen 150 can include a commodity image recognition area 152 individually recognizing the images of the plurality of commodities included in the video of the menu 7 (FIG. 1), an appended data display unit 153 for displaying appended data of the identified commodity, and a decision button 154 for deciding the order of the commodity. Further, when the order screen 150 is on display, the operation of the operation unit 155 having various types of operation buttons provided next to the display of the smartphone 10 is also received by the operation reception unit 24 of the smartphone 10 (FIG. 4), as an operation to the order screen 150. Here, the return button 156 and the menu button 157 of the operation unit 155 are used.

Figure 25:
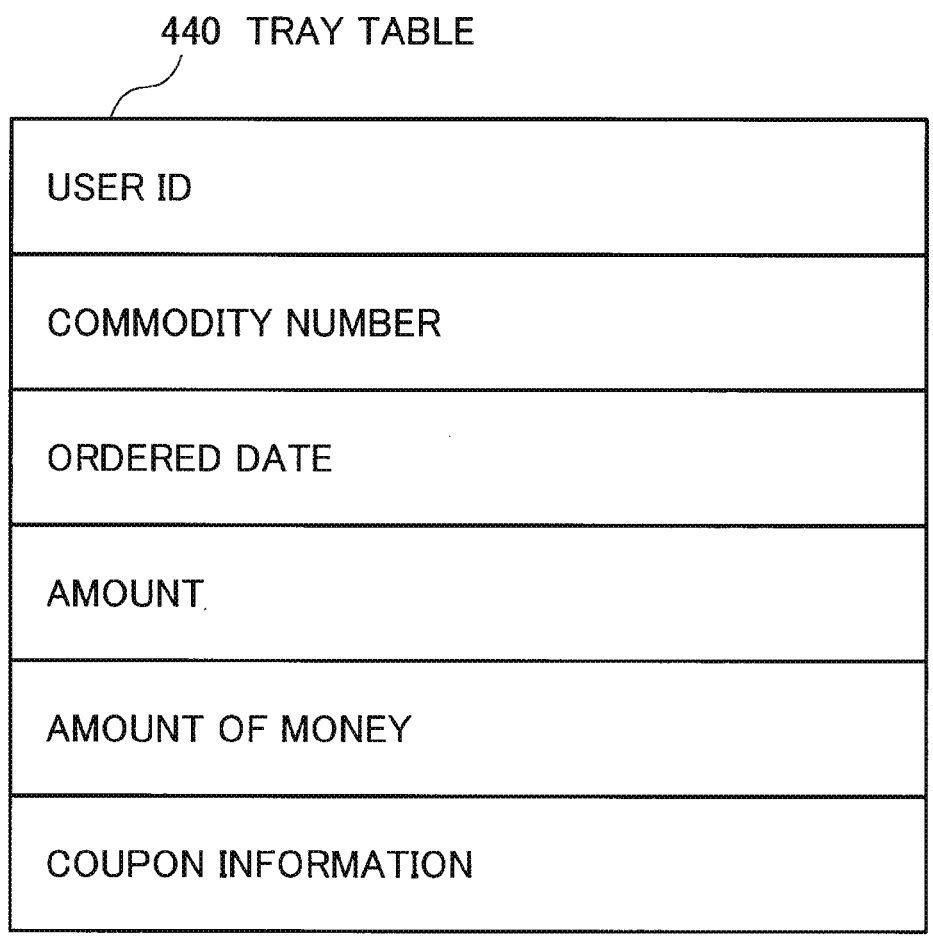
FIG. 25 is a diagram showing an example of a structure of a tray table of an information processing device according to an exemplary embodiment of the present invention.

When the decision button 154 is pushed, the order of the commodity is received, and the order information is stored in the tray table 440 of FIG. 25. The tray table 440 of FIG. 25 can be retained in any memory of the smartphone 10 or the server device 60. When the return button 156 is pushed, the display screen returns to the main screen 130. When the menu button 157 is pushed, the display screen transitions to a sub menu window 151, and the tray button 158 and the main button 159 are displayed in the lower part of the order screen 150. When the tray button 158 is pushed, the display screen returns to the tray screen 170. When the main button 159 is pushed, the display screen returns to the main screen 130. When the tray button 139 is pushed on the main screen 130, the display screen transitions to the tray screen 170.

Figure 15:
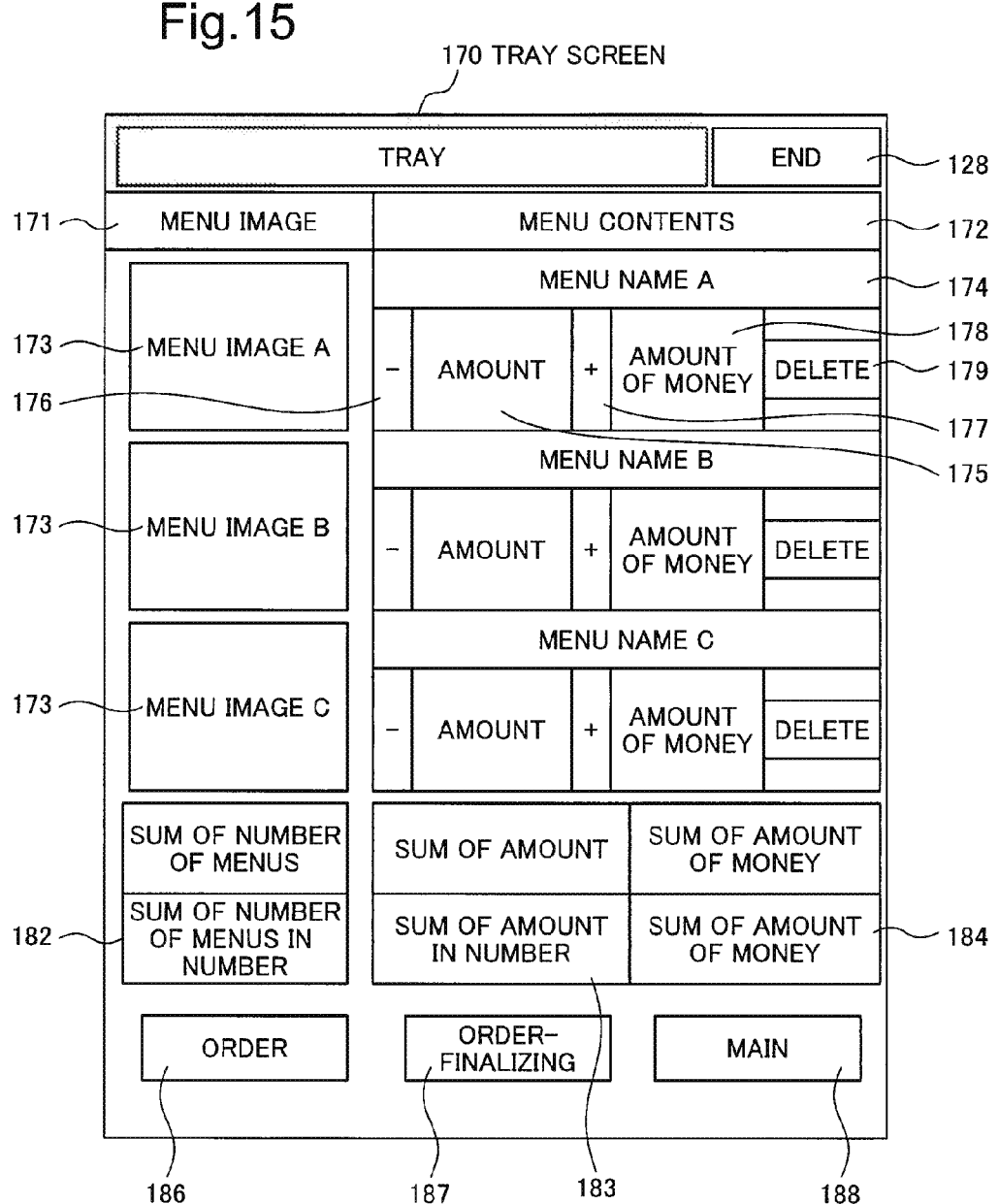
FIG. 15 is a diagram showing a tray screen of the information processing device according to the exemplary embodiment of the present invention.

As shown in FIG. 15, the tray screen 170 includes a menu image column 171 and a menu contents column 172. In the tray, the current non-finalized order state is stored. On the tray screen 170, the current non-finalized order state stored in the tray is displayed. Note that as described above, the tray can be provided in the memory of the smartphone 10 or the server device 60.

In the menu image column 171, respective menu images 173 of the commodities ordered on the order screen 150 are displayed. The menu contents column 172 includes an ordered-commodity's menu name 174, an amount display unit 175 for displaying the amount of order, a money amount display unit 178 displaying the corresponding money amount, and a delete button 179 to be operated to delete the menu. FIG. 15 shows an example in which three menus A, B, C are selected. In addition, the amount of order can be increased or decreased by an increase button 177 (+: plus) and a decrease button 176 (−: minus). The menu image column 171 and the menu contents column 172 can respectively scroll-display a plurality of rows.

The tray screen 170 includes a sum-of-menus in number display unit 182, an sum-of-amount in number display unit 183, and a money amount sum display unit 184. The sum-of-menus in number display unit 182 displays the sum of the number of menus in the tray. The sum-of-amount in number display unit 183 displays the sum of amount of all the menus in the tray. The money amount sum display unit 184 displays the total amount of money for all the menus in the tray.

Furthermore, the tray screen 170 includes an order button 186, an order-finalizing button 187, a main button 188, and an end button 128. In addition, the tray screen 170 may be provided with a button to receive my-menu automatic order registration, by which a user can register his favorite menu or a menu to always order. Then, respective registrations may be received on the tray screen 170, and the registration information may be transmitted by the smartphone 10 to the server device 60, and registered in the database 50. These pieces of information can be retained in the database 50 as user attribute information 450 in FIG. 26.

When the order button 186 is pushed, the screen to receive final confirmation of the ordered contents is displayed (Step S413). When the order is OK (Y in Step S415), the order data is accepted, and the display screen returns to the main screen 130. When the order is canceled (N in Step S415), the display screen returns to the tray screen 170. During this process, the order data transmission unit 114 transmits the order data to the order reception device 80, and the printer 82 prints out the order contents (kitchen printer output 194 of FIG. 10). When the transmission was successful, the order contents in the tray is cleared.

Although this example has a configuration in which order data is output from a kitchen printer, it is not always necessary to take measures to output from a kitchen printer. Any means for conveying the order contents to the staff of the shop can be used, such as a display posted on a screen or announcement through voice and audio.

When the delete button 179 is pushed, after the deletion confirmation message is displayed (Step S417), the menu for which the delete button 179 is pushed is deleted, and the display screen returns to the tray screen 170. Here, alternatively, the menu deletion may be performed after receiving the operation to confirm the deletion.

When the main button 188 is pushed, the display screen returns to the main screen 130. During this process, it is preferable to retain the contents in the tray. When deleting the contents in the tray, it is preferable to present a confirmation message to a user to request confirmation from the user, before actually deleting the contents in the tray.

When the end button 128 is pushed, the confirmation message to confirm ending is displayed (Step S419). When the ending confirmation is received (Y in Step S421), the present application is ended. When the ending is cancelled (N in Step S421), the display screen returns to the tray screen 170.

Figure 6:
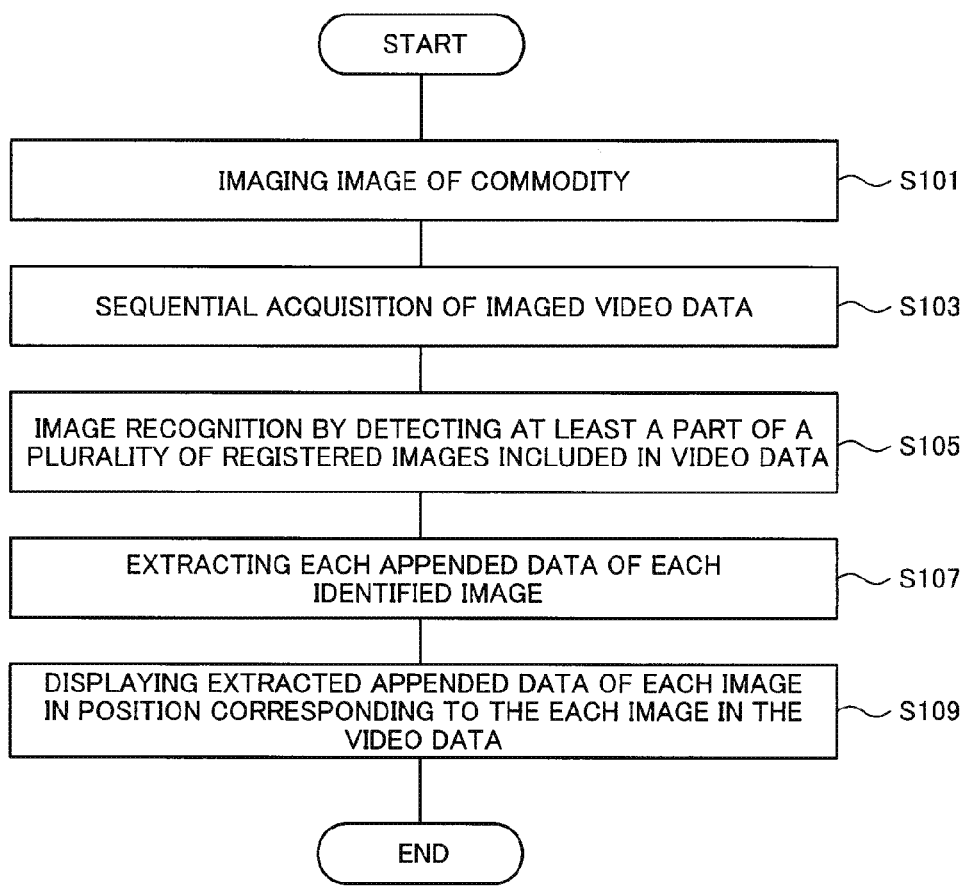
FIG. 6 is a flowchart showing an example of an operation of the information processing device according to the exemplary embodiment of the present invention.

A data processing method of the information processing device 100 in the above-described configuration is described as follows. FIG. 6 is a flowchart showing an example of an operation of an information processing device 100 according to the present exemplary embodiment.

The data processing method performed by the information processing device 100 according to the present exemplary embodiment is such that the information processing device 100 sequentially acquires video data resulting from imaging, by an imaging unit, of at least a part of an imaging target showing a plurality of items (Step S101, Step S103), detects that the video data includes at least a part of a pre-registered image and recognizes the image (Step S105), extracts appended data of each identified image from the appended data storage unit 106 storing therein pieces of appended data corresponding to a plurality of recognized images shown in the imaging target respectively (Step S107), and displays extracted appended data of each image (Step S109).

More specifically, in the information processing device 100 according to the present exemplary embodiment, first, the video data acquisition unit 102 images, using an imaging unit, at least a part of an imaging target showing images of a plurality of commodities (Step S101), and sequentially acquires imaged video data (Step S103). Then, the image recognition unit 104 identifies a plurality of commodities included in the video data from the images of the commodities included in the video data, as well as acquiring pieces of identification information for the commodities respectively (Step S105).

Next, based on the identification information of the commodities acquired by the image recognition unit 104, the appended data extraction unit 108 extracts, from the appended data storage unit 106, appended data of each commodity identified by the image recognition unit 104 (Step S107).

Then, the appended data display unit 110 displays the appended data of each commodity extracted by the appended data extraction unit 108, in the position corresponding to the commodity in the video data (Step S109).

As described above, the information processing device 100 according to the present exemplary embodiment of the present invention can be realized by the smartphone 10 and the server device 60. There are various ways to allocate functions between the smartphone 10 and the server device 60. Note that in the following example, the above-described second image detection method is adopted.

Figure 7:
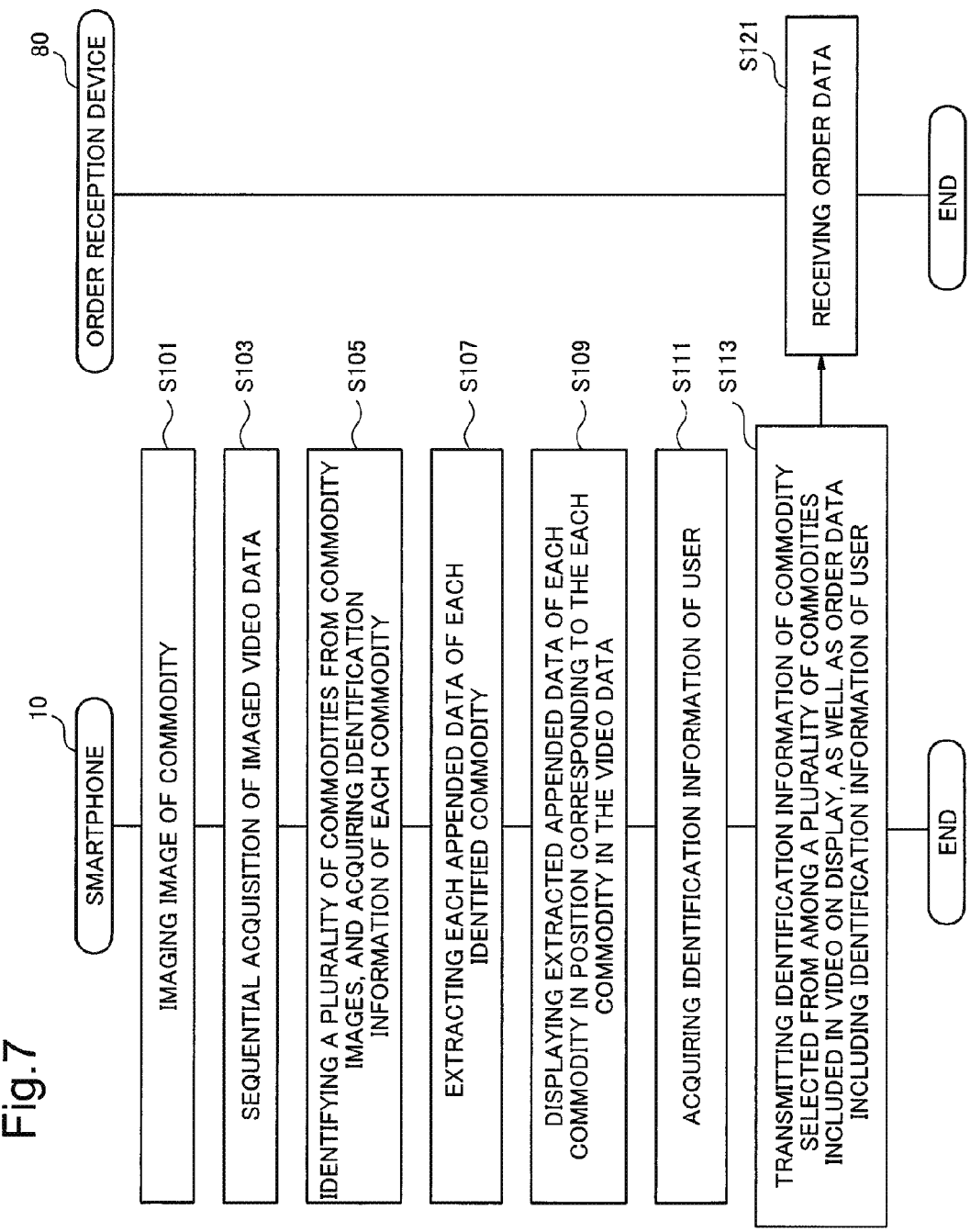
FIG. 7 is a flowchart showing an example of an operation of the information processing device according to the exemplary embodiment of the present invention.

FIG. 7 is an example in which all the configuration of FIG. 2 is realized only using the smartphone 10. In this example, the smartphone 10 performs all of Step S101-Step S109 in the process procedures shown in FIG. 6.

Then, the user identification information acquisition unit 112 acquires identification information of a user (Step S111).

Then, based on the composite video data acquired by the appended data display unit 110, the order data transmission unit 114 transmits identification information of a commodity selected from among the plurality of commodities included in the video displayed in the display unit in a mobile terminal size, as well as order data including the identification information of the user (Step S113).

The order data transmitted by the smartphone 10 is received by the order reception device 80 (Step S121), and the order processing completes. During this process, the smartphone 10 can use the wireless LAN communication unit 20 in FIG. 4 to transmit the order data to the order reception device 80.

Figure 8:
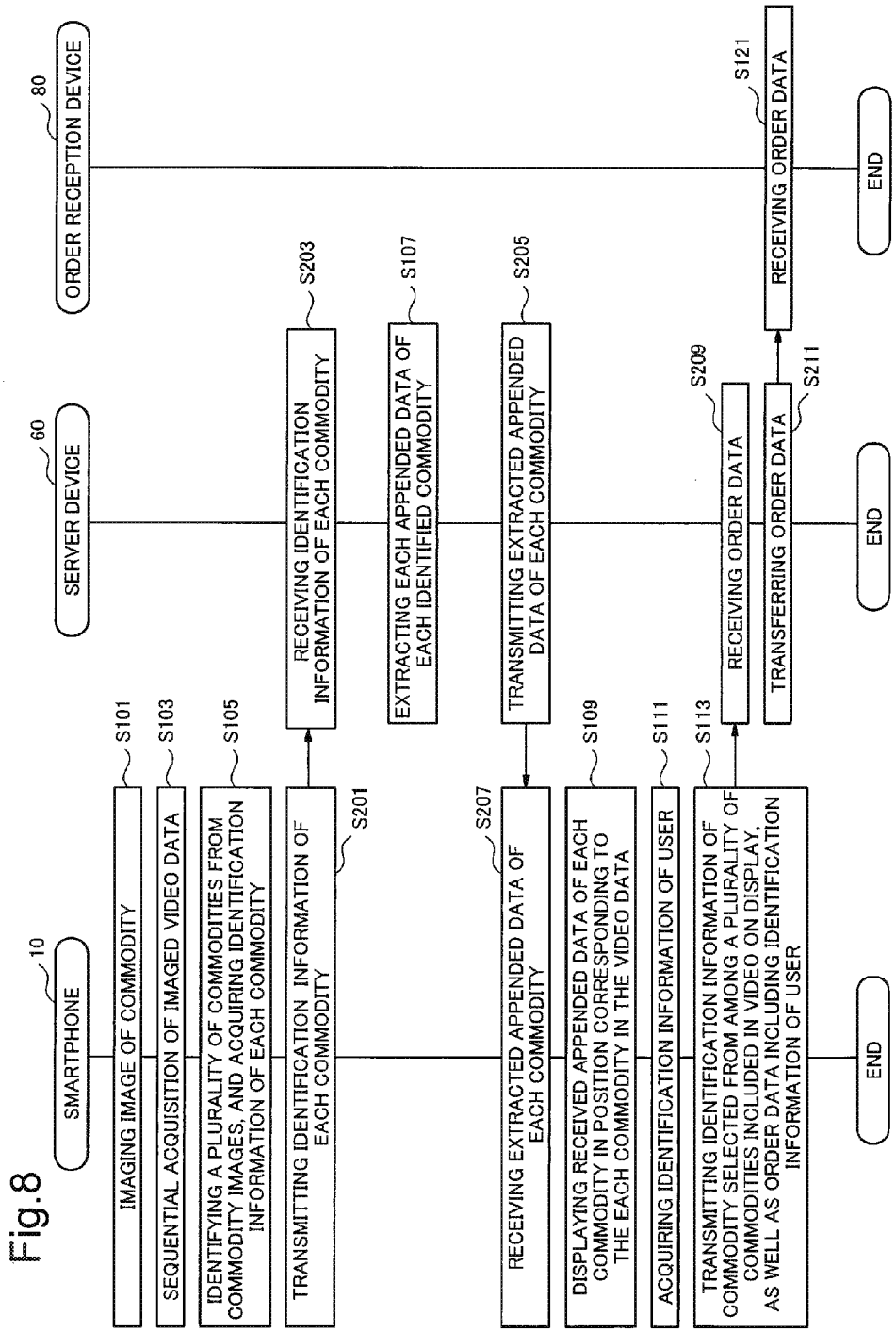
FIG. 8 is a flowchart showing an example of an operation of the information processing device according to the exemplary embodiment of the present invention.

FIG. 8 shows an example in which the processing up to the commodity identification is performed by the smartphone 10, and the extraction of appended data of a commodity is performed in the server device 60. In this example, the server device 60 performs extraction of appended data of a commodity in Step S107 of the order processing procedure shown in FIG. 6. Also in this example, the order data is not transmitted from the smartphone 10 to the order reception device 80, but is transmitted via the server device 60 to the order reception device 80. This example includes, in addition to the processing procedure of FIG. 6, Step S111, Step S113, Step S121, and Step S201-Step S211.

The smartphone 10 transmits, to the server device 60, the identification information of the commodity acquired in Step S105 (Step S201). The server device 60 receives the identification information of the commodity from the smartphone 10 (Step S203), and based on the received identification information of the commodity, extracts each of appended data of each received commodity from the appended data storage unit 106 (Step S107).

Then, the server device 60 transmits, to the smartphone 10, the extracted appended data of the commodity (Step S205). The smartphone 10 receives the appended data of the commodity from the server device 60 (Step S207), and the appended data display unit 110 displays the received appended data of each commodity, in the position corresponding to the commodity in the video data (Step S109).

Then, the user identification information acquisition unit 112 acquires the identification information of the user (Step S111).

Then, the order data transmission unit 114 transmits the order data including the identification information of the user as well as the identification information of the commodity selected from among the plurality of commodities included in the video displayed in the display unit of a mobile terminal size based on the composite video data acquired by the appended data display unit 110 (Step S113).

Then, in Step S113, the order data is transmitted from the smartphone 10 to the server device 60, and the order data is transferred to the order reception device 80 from the server device 60 having received the order data in Step S209 (Step S211). During this process, the smartphone 10 can use the mobile telephone network communication unit 18 in FIG. 4, to transmit the order data to the server device 60. For example, the smartphone 10 uploads the order data to the web server of the server device 60.

Figure 9:
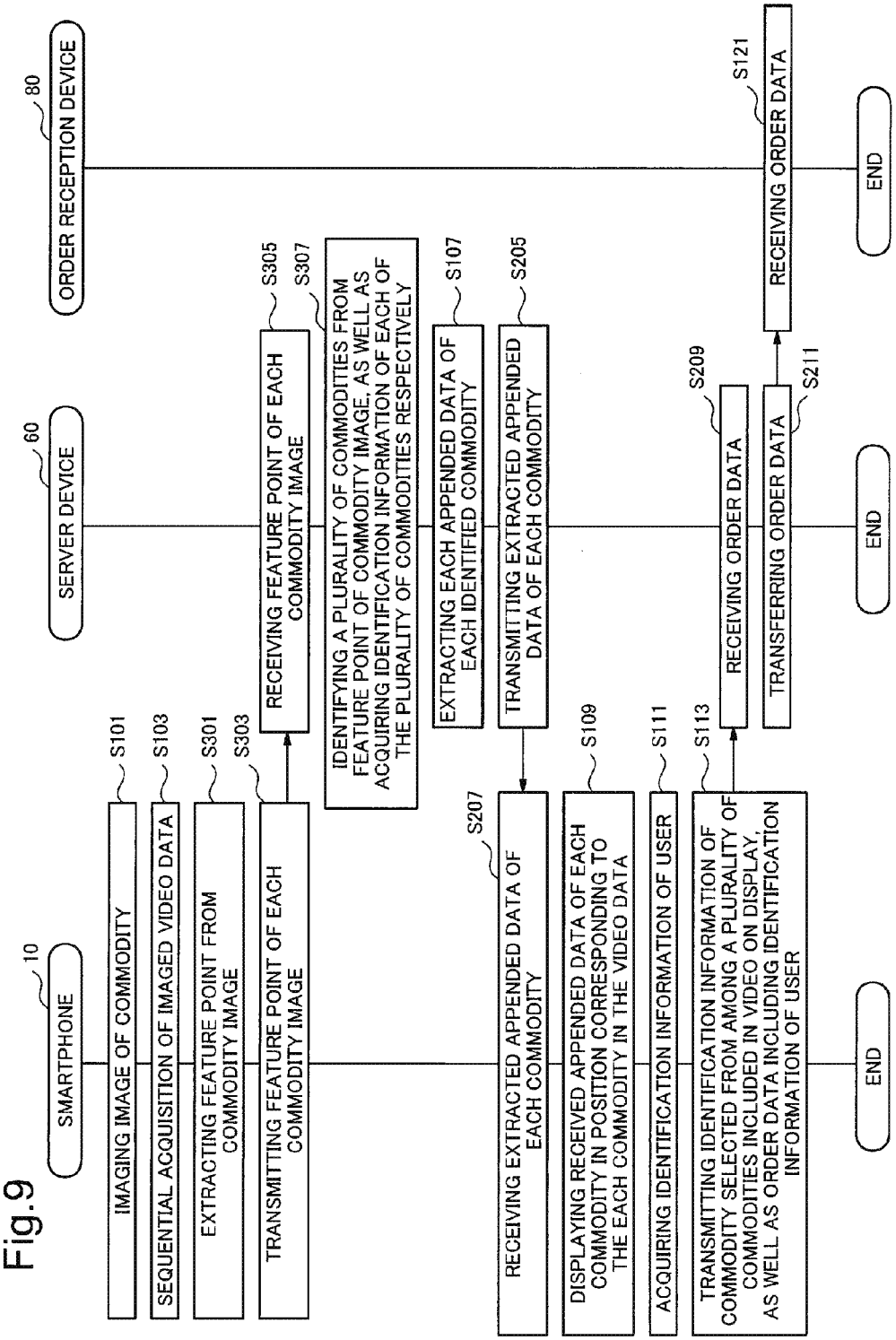
FIG. 9 is a flowchart showing an example of an operation of the information processing device according to the exemplary embodiment of the present invention.

Further, FIG. 9 shows an example in which the processing up to the extraction processing of feature point of the image of the commodity is performed by the smartphone 10, and the identification of the commodity from the feature point and the extraction of its appended data are performed in the server device 60. In this example, the processing of Step S105 of FIG. 6 is allocated to be performed by the smartphone 10 and the server device 60 in Step S301 and Step S307, and Step S107 in FIG. 6 is performed in the server device 60. Further, this example has a configuration of transmitting the order data via the server device 60 to the order reception device 80. This example includes, in addition to the processing procedure of FIG. 6, Step S301-Step S307, Step S205-Step S211, Step S111, Step S113, and Step S121.

The smartphone 10 extracts feature point(s) of an image of each commodity, from the images of the commodities included in the video data acquired in Step S103 (Step S301). Next, the smartphone 10 transmits the feature point(s) of the image of each commodity to the server device 60 (Step S303). The server device 60 receives the feature point(s) of the image of each commodity from the smartphone 10 (Step S305), and identifies the plurality of commodities included in the video data, from the received feature point(s) of the image of each commodity, as well as acquiring the identification information of each commodity (Step S307).

Then, based on the acquired identification information of the commodity, the appended data extraction unit 108 extracts appended data of each identified commodity, from the appended data storage unit 106 (Step S107). The processing hereafter is similar to that of FIG. 8.

Note that the example of FIG. 7 is configured to transmit order data directly from the smartphone 10 to the order reception device 80, however may alternatively be configured to transmit order data via the server device 60. In addition, although the examples of FIG. 8 and FIG. 9 are configured to transmit order data from the smartphone 10 to the order reception device 80 via the server device 60, however may alternatively be configured to transmit order data directly from the smartphone 10 to the order reception device 80.

As explained so far, the information processing device 100 according to the exemplary embodiment of the present invention can display, to users, information useful for users related to a plurality of commodities in a list form for the users to view easily, thereby receiving an order. In addition, the information processing device 100 according to the present exemplary embodiment can be realized using a smartphone 10 or the like carried by users, which can help restrain the cost incurred in introducing a system for the shop.

Second Exemplary Embodiment

Figure 17:
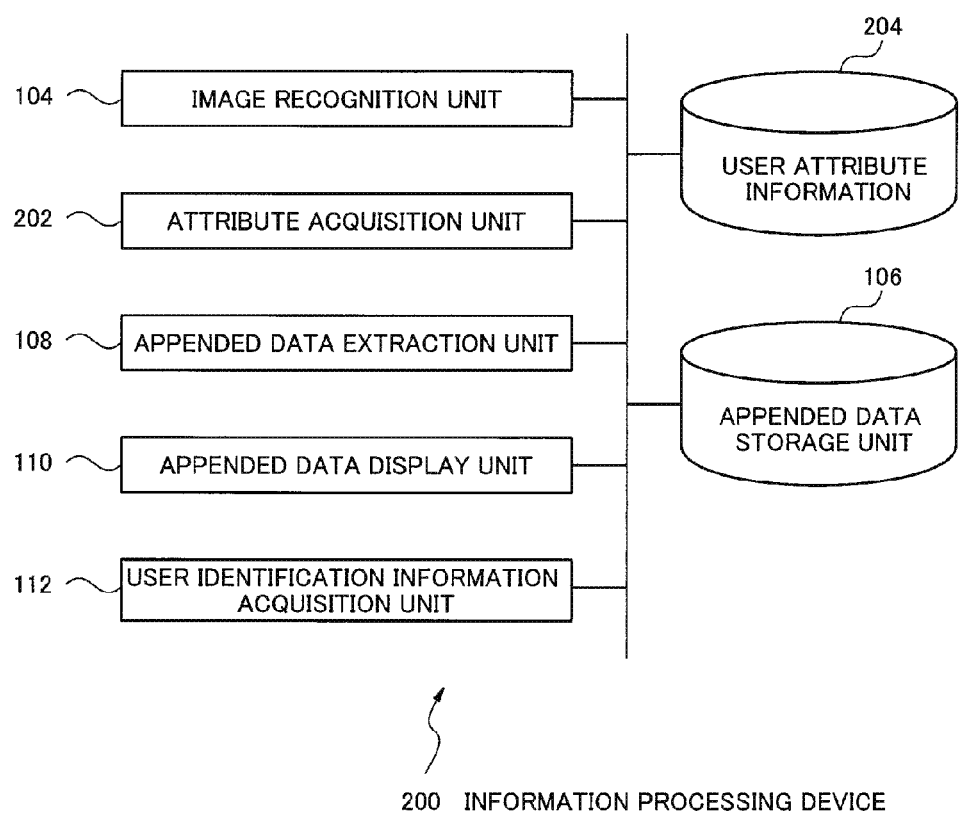
FIG. 17 is a functional block diagram showing a configuration of an essential part of an information processing device according to an exemplary embodiment of the present invention.

FIG. 17 is a functional block diagram showing a configuration of an essential part of an information processing device 200 according to an exemplary embodiment of the present invention. The information processing device 200 according to the present exemplary embodiment is different from the information processing device 100 according to the present exemplary embodiment in extracting appended data according to user situation (attribute).

The information processing device 200 according to the present exemplary embodiment includes, in addition to the configuration of the information processing device 100 according to the above-described embodiment in FIG. 2, an attribute acquisition unit 202 and a user attribute information storage unit ("user attribute information" in the drawing) 204.

Figure 26:
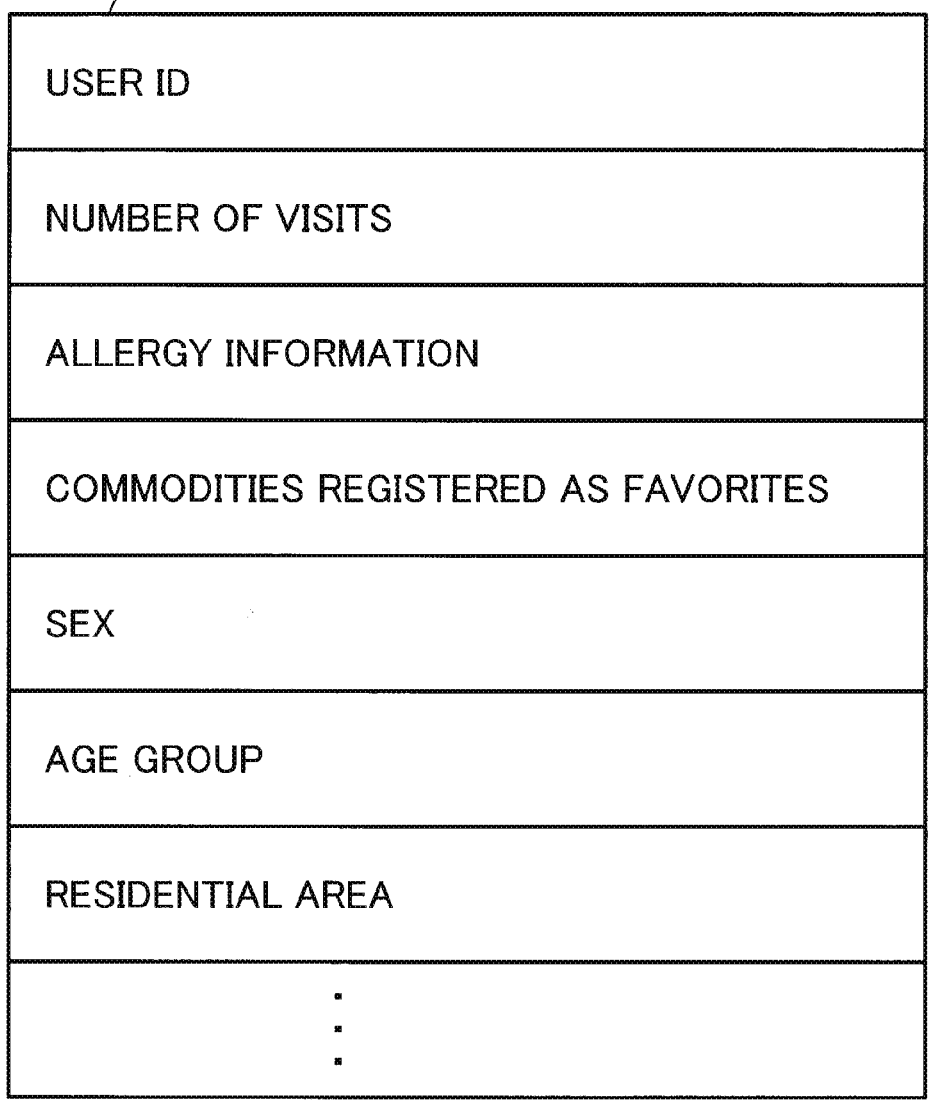
FIG. 26 is a diagram showing an example of a structure of user attribute information of an information processing device according to an exemplary embodiment of the present invention.

As shown in the user attribute information 450 of FIG. 26, the user attribute information storage unit 204 can include the number of visit, allergy information, or the like. In addition, the user attribute information storage unit 204 can include the number of points owned by the user, the order history, the commodity information for the commodity having been registered as the user's favorite commodity or as the commodity to be automatically ordered, the other profile information (sex, age group, residential area, family makeup, whether the user is on a diet or not, area of interest, hobbies), whether the user uses other shops, or the like.

The attribute acquisition unit 202 acquires attribute information of a user. Here, the attribute acquisition unit 202 refers to the user attribute information storage unit 204, and identifies the user by the identification information acquired by the user identification information acquisition unit 112, for example. Alternatively, the attribute acquisition unit 202 may refer to, as the user attribute information, information related to a user registered in another database such as a commodity purchase history, or information related to the shop that the user is visiting.

The appended data extraction unit 108, for each image recognized by the image recognition unit 104, extracts each appended data corresponding to attribute information of a user acquired by the attribute acquisition unit 202.

In addition, according to the present exemplary embodiment, attribute information of a user includes allergy information.

The appended data storage unit 106 stores allergic substance information included in each of a plurality of images, as appended data. The appended data extraction unit 108, for each image recognized by the image recognition unit 104, extracts each allergic substance information included in the allergy information of the user.

Based on the allergic substance information extracted by the appended data extraction unit 108, the appended data display unit 110 identifies an image from which the allergic substance information regarding an allergic substance that the user may be allergic to is extracted, from among the plurality of images recognized by the image recognition unit 104, and displays a predetermined display element in a position corresponding to the identified image in the video data.

In addition, in the information processing device 200 according to the present exemplary embodiment, the appended data display unit 110 changes the visibility of the appended data for each image recognized by the image recognition unit 104, according to the attribute information of the user acquired by the attribute acquisition unit 202.

Figure 18:
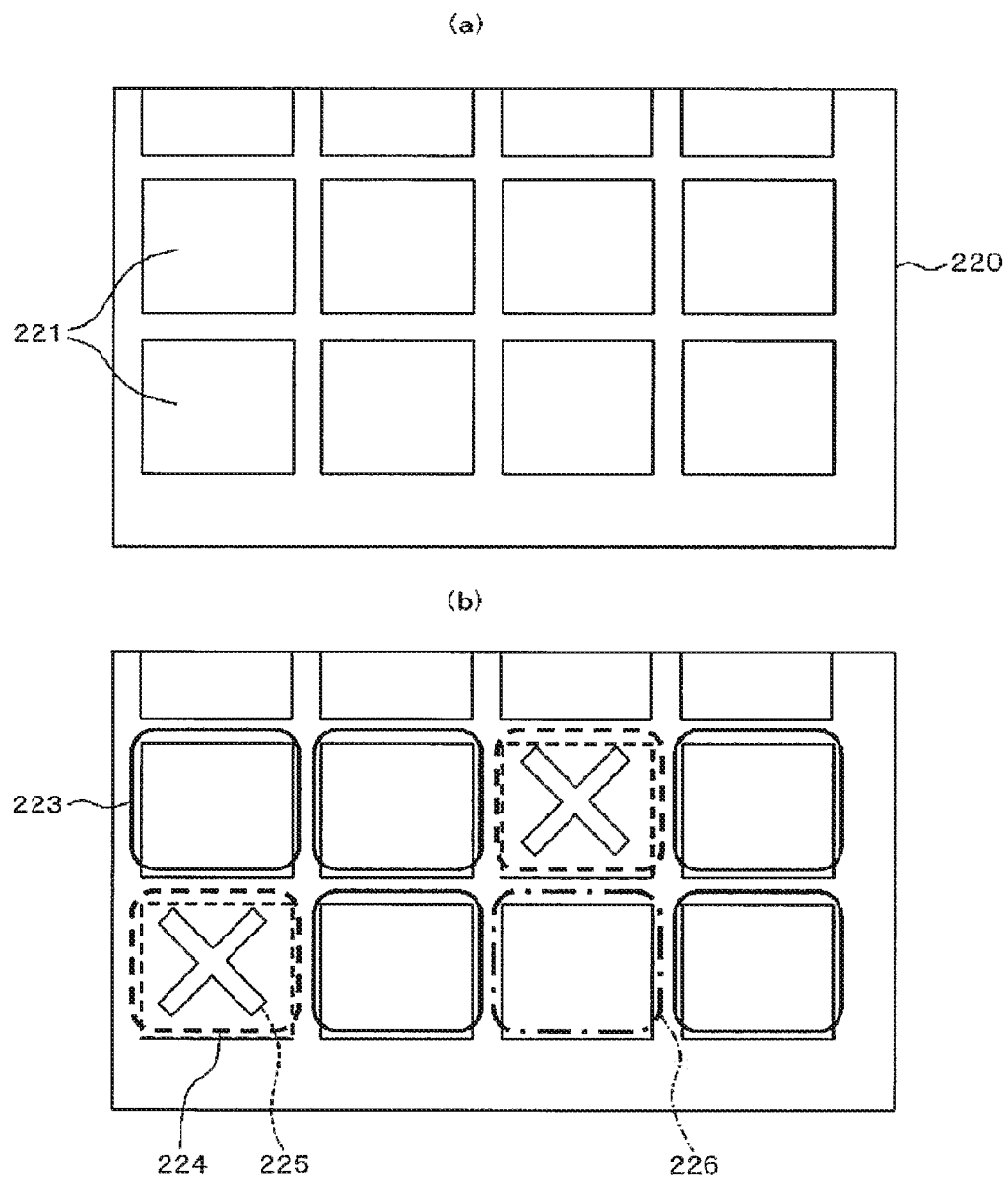
FIG. 18 is a diagram showing an example in which allergy information is displayed as a list on an order screen of the information processing device according to the exemplary embodiment of the present invention.

In the present exemplary embodiment, when a plurality of commodity images 221 are displayed on the order screen 220 shown in FIG. 18(a), the possible allergy display unit 224 is displayed over the image of the commodity that the user may be allergic to, as shown in FIG. 18(b). An allergy OK display unit 223 is displayed over an image of a commodity that the user is not allergic to and so can eat without anxiety. When it is not certain whether the user is allergic or not to the commodity, the image of an allergy indefinite display unit 226 is overlapped.

The possible allergy display unit 224 may be hatching display to conceal the image of the original commodity, for example. The possible allergy display unit 224 may also be an image from which the user can tell at a glance that he or she should not order the commodity, such as clear letters "NG" or a cross-out (x) mark 225 displayed over the image of the commodity.

The allergy OK display unit 223 may be a display of a frame that can make the image of the original commodity particularly noticeable or an image that draws attention, for example. The allergy OK display unit 223 may also be the image of the original commodity sterically popping up three dimensionally and the like. The allergy indefinite display unit 226 may be an image overlapped on the image of the original commodity, having undergone skeleton process to the extent that the image of the original commodity is slightly unidentifiable compared to the allergy OK display unit 223.

Figure 19:
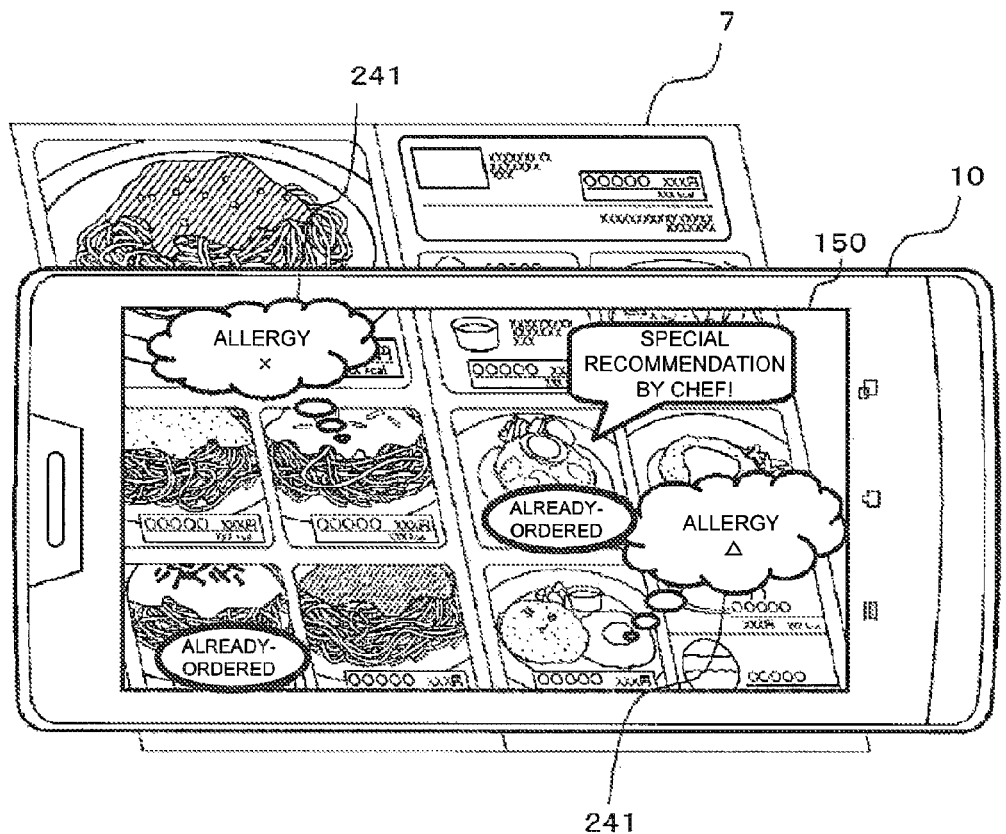
FIG. 19 is a diagram showing an example of an order screen of the information processing device according to the exemplary embodiment of the present invention.

Alternatively, the appended data display unit 110 may use balloon displays 241, to mark "O" for allergy OK, "x" for possible allergy, and Δ for allergy indefinite, or the like, as shown in FIG. 19.

The appended data display unit 110 may also perform overlapping display of a blue frame for allergy OK, a red frame for possible allergy, and a gray frame to show whether allergic substances are included is indefinite.

In addition, when the user is on a diet, the appended data extraction unit 108 may extract those having a low calorie from among the commodities, and the appended data display unit 110 may display appended data to recommend to a user. It is also possible that the appended data extraction unit 108 extract the user's preferences from the order history or the browsing history or the like of the user, and the appended data display unit 110 display appended data by which to recommend a menu matching the preference of the user. In addition, the appended data display unit 110 may display appended data including an operation button for receiving from a user the registration of his or her favorite commodity on the commodity screen, or appended data indicating that it is the registered commodity or its related commodity. For an already purchased commodity, the appended data display unit 110 may display appended data indicating that it is already purchased. For a commodity the user repeatedly purchase, the appended data display unit 110 may display appended data recommending purchasing it again.

Among images of a plurality of commodities, for commodities to recommend to the user or commodities enjoying a high need, it is preferable to display appended data to enhance visibility of those images so that the user can easily pay attention to them. On the other hand, for commodities not having a high need or not suited commodities, e.g., commodities for adults directed to those under age, or commodities for men directed to female users, the displayed appended data preferably has decreased image visibility not to attract the user's attention.

In addition, it is possible to gradually change the visibility of the images depending on the user's needs. For example, by applying 3D processing to commodity images as appended data, the images of the commodities that have a high need among users can be made more easier to be paid attention to by popping them up more forward. Or, by applying skeleton processing to the commodity images as appended data, the images of the commodities not having a high need among users can be made less easier to be paid attention to by thickening the hatching.

When the user's like/dislike information has been registered, for the menu including an ingredient that the user does not like, a display similar to that for the aforementioned allergy information can be used to draw the user's attention. In addition, if it is possible to serve the commodity "without pickle," a display such as "possible to serve this without pickle" may be added.

When setting up "supporting campaign" for supporting small children to overcome their dislikes, the menus including the registered ingredients that they dislike may be marked with "carrot overcome support!" or the like, and when the marked menu is selected, such explanation as "if you succeeded in eating all, you can earn one more toy for kid's lunch" or the like may be added.

As described above, the information processing device 200 according to the present exemplary embodiment plays a similar effect to that of the above-described exemplary embodiment, but further improves the visibility of the plurality of commodities by presenting to a user those of the plurality of commodities that match the user's situation at a glance, and therefore has an advantageous effect to make it easier for users to discern commodities that suit them. In addition, the information processing device 200 according to the present exemplary embodiment can make a user recognize at a glance the commodities to particularly appeal to the user. Conversely, as for the commodities that are not required much by the user, it is possible to delete the commodities from the alternatives in the commodity list, thereby enabling the user to discern the commodities that he or she need quickly.

Third Exemplary Embodiment

Figure 20:
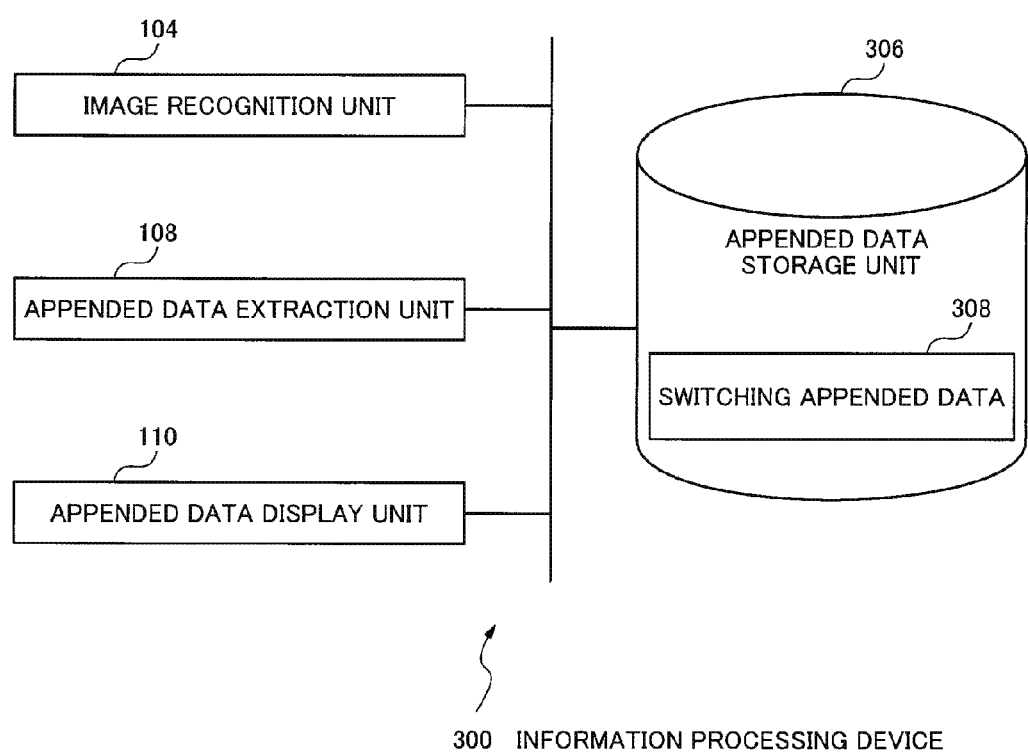
FIG. 20 is a functional block diagram showing a configuration of an essential part of an information processing device according to an exemplary embodiment of the present invention.

FIG. 20 is a functional block diagram showing a configuration of an essential part of an information processing device 300 according to an exemplary embodiment of the present invention. The information processing device 200 according to the present exemplary embodiment is different from the information processing device 100 according to the above-described exemplary embodiment in displaying, in the position of the commodity image, switching appended data which is different according to a predetermined condition, e.g., for each time zone and each day.

The information processing device 300 according to the present exemplary embodiment further includes an appended data storage unit 306 including switching appended data 308, in addition to the configuration of the information processing device 100 according to the above-described exemplary embodiment in FIG. 2. It should be noted here that the present exemplary embodiment can also include the configuration of the information processing device 200 according to the above-described exemplary embodiment in FIG. 17.

The appended data storage unit 306 stores, as appended data for at least one image, different pieces of switching appended data 308 according to predetermined conditions.

Then, in the present exemplary embodiment, the appended data extraction unit 108 extracts switching appended data 308 matching the condition, for at least one image recognized by the image recognition unit 104.

The appended data display unit 110 displays the switching appended data 308 matching the condition, having been extracted by the appended data extraction unit 108, in a position corresponding to the image corresponding to the appended data in the video data.

Figure 21:
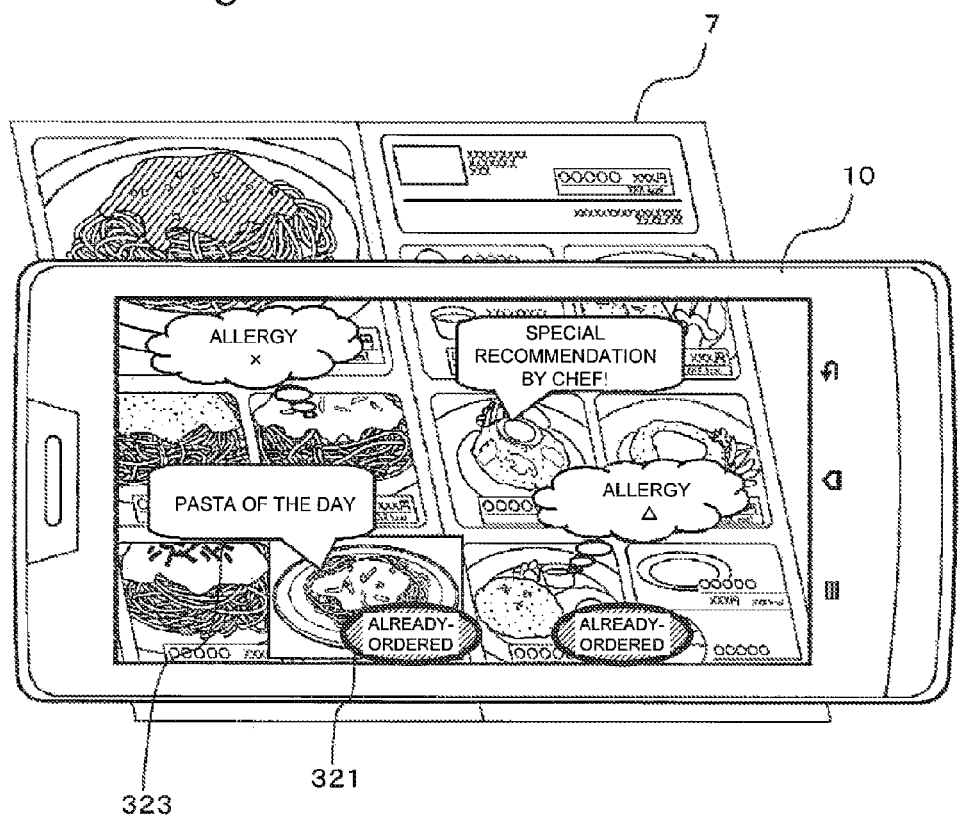
FIG. 21 is a diagram showing an example in which a menu of the day is displayed on an order screen of an information processing device according to an exemplary embodiment of the present invention.

As shown in FIG. 21, the appended data display unit 110 can display, on the commodity image of the menu 7, a today's special menu image 321 and a balloon image 323, as switching appended data 308. In this way, a general image of pasta is posted on the menu 7, and the appended data display unit 110 can display the image, the commodity name, or the like of a specific pasta that matches the current time zone, day of week, and date, in a position of the commodity image.

Alternatively, in another exemplary embodiment, the appended data display unit 110 can display switching appended data 308 prepared for each shop or region, season, and weather. Alternatively, for example, the specific commodity name is not disclosed on the catalogue as a surprise commodity, and the appended data display unit 110 may disclose the commodity at a certain processing timing. The appended data display unit 110 can promote sales of a commodity most suited at a certain processing timing, such as a seasonal commodity. Still more, the appended data display unit 110 may switch to the image of the sales promotion target commodity during the time-limited sale or the campaign, by designating the period. This can help effectively promote sales of a specific commodity.

There are cases where the menu itself changes in each time zone, and the amount of money changes for a set menu even for the same commodity image, between the day and the night. In the present exemplary embodiment, it is possible to prepare pieces of appended data suited for several processing timings in the appended data storage unit 106, and to make the appended data extraction unit 108 refer to the appended data storage unit 106 in which the appended data is switched to those matching the processing timing, thereby extracting the appended data.

This configuration has an effect similar to that of the above-described exemplary embodiment, as well as enabling to display appended data corresponding to a certain processing timing. Therefore, it becomes possible to sell commodities by switching them at the timing of order processing without necessitating to specify the commodities at the time of posting the imaging target.

As described above, the exemplary embodiments of the present invention have been described with reference to the drawings. However, these are examples of the present invention, and various other configurations can be adopted.

In the above, the invention of the present application has been described by referring to the exemplary embodiments and the embodiment examples. However, the invention of the present application is not limited to these exemplary embodiments and the embodiment examples. As those skilled in the art could understand, various modifications can be made on the configuration or details of the invention of the present invention within the scope of the invention of the present application.

It should be noted that acquiring or using information related to users in the present invention shall be performed legally.

Examples of various modes are described below.
1. A data processing method for an information processing device, the method includes that: the information processing device
sequentially acquires video data resulting from imaging by means of an imaging unit at least a part of an imaging target showing a plurality of items;
detects that the video data contains at least a part of a pre-registered image and recognizes the image;
extracts, from an appended data storage unit that stores therein pieces of appended data respectively corresponding to the plurality of recognized images shown in the imaging target, each piece of appended data corresponding to each of the plurality of images; and
displays extracted appended data of each image.
2. The data processing method for an information processing device according to Item 1,
the information processing device displaying the appended data of each image extracted by the appended data extraction unit, in a position corresponding to the image of the video data.
3. The data processing method for an information processing device according to Item 1 or 2, the information processing device
acquiring attribute information related to a user, and
extracting, for each image recognized by the image recognition unit, each appended data corresponding to the attribute information of the user acquired by the attribute acquisition unit.
4. The data processing method for an information processing device according to Item 3, wherein the attribute information of the user includes allergy information,
the appended data storage unit stores, as the appended data, allergic substance information included in each of the plurality of images,
the appended data extraction unit
extracts each allergic substance information included in the allergic information of the user, for each image recognized by the image recognition unit, and
based on the allergic substance information extracted by the appended data extraction unit, the appended data display unit identifies the image for which the allergic substance information to which the user may be allergic to is extracted, from among a plurality of images recognized by the image recognition unit, and displays a predetermined display element in a position corresponding to the identified image of the video data.
5. The data processing method for an information processing device according to Item 3 or 4, wherein
the information processing device changes visibility of the appended data according to the attribute information of the user acquired by the attribute acquisition unit, for each image recognized by the image recognition unit.
6. The data processing method for an information processing device according to any of Items 1-5, wherein
the appended data storage unit stores switching appended data different according to predetermined conditions, as appended data for at least one image,
the information processing device
extracts, for at least one image recognized by the image recognition unit, switching appended data corresponding to the condition, and
displays the switching appended data corresponding to the condition extracted by the appended data extraction unit, in a position corresponding to an image corresponding to the appended data of the video data.
7. The data processing method for an information processing device according to any of Items 1-6, wherein
the appended data includes recommendation information, discount information, coupon information, allergy information, ratings information, or option service information regarding the image.
8. The data processing method for an information processing device according to any of Items 1-7, wherein
the information processing device transmits data of an image selected from among a plurality of images included in a video displayed in a display unit based on composite video data acquired by the appended data display unit.
9. The data processing method for an information processing device according to any of Items 1-8, wherein the information processing device
temporarily stores, in a storage unit, information of a plurality of images selected by the data transmission unit, presents, to a user, information of the plurality of images in storage, and
receives a confirmation operation, and transmits the information of the plurality of images, after the confirmation reception unit has received the confirmation operation.
10. The data processing method for an information processing device according to any of Items 1-9, wherein
the information processing device is a user mobile terminal or a server device communicable with the user mobile terminal.
11. A program that causes a computer serving as an information processing device to execute procedures of:

sequentially acquiring video data resulting from imaging by means of an imaging unit at least a part of an imaging target showing a plurality of items;

detecting that the video data contains at least a part of a pre-registered image and recognizing the image;

extracting, from an appended data storage unit that stores therein pieces of appended data respectively corresponding to the plurality of recognized images shown in the imaging target, each piece of appended data corresponding to each of the plurality of images; and displaying extracted appended data of each image.

12. The program according to Item 11, that causes the computer to execute a procedure of displaying extracted appended data of each image at a position corresponding to each image of the video data.

13. The program according to Item 11 or 12, that causes the computer to execute procedures of acquiring attribute information related to a user, and extracting, for each image recognized by the image recognition unit, each appended data corresponding to the attribute information of the user acquired by the attribute acquisition unit.

14. The program according to Item 13, wherein the attribute information of the user includes allergy information, the appended data storage unit stores, as the appended data, allergic substance information included in each of the plurality of images, the program causing the computer to execute procedures of:

extracting each allergic substance information included in the allergic information of the user, for each image recognized by the image recognition unit, and based on the allergic substance information extracted by the appended data extraction unit, and identifying the image for which the allergic substance information to which the user may be allergic to is extracted, from among a plurality of images recognized by the image recognition unit, and display a predetermined display element in a position corresponding to the identified image of the video data.

15. The program according to Item 13 or 14, for causing the computer to execute a procedure of changing visibility of the appended data according to the attribute information of the user acquired by the procedure to acquire an attribute, for each image recognized by the procedure to recognize the image.

16. The program according to any of Items 11-15, wherein the appended data storage unit stores switching appended data different according to predetermined conditions, as appended data for at least one image, and the program for causing the computer to execute procedures of:

extracting, for at least one image recognized by the image recognition unit, switching appended data corresponding to the condition, and displaying the switching appended data corresponding to the condition extracted by the appended data extraction unit, in a position corresponding to an image corresponding to the appended data of the video data.

17. The program according to any of Items 11-16, wherein the appended data includes recommendation information, discount information, coupon information, allergy information, ratings information, or option service information regarding the image.

18. The program according to any of Items 11-17, for causing the computer to execute a procedure of transmitting data of an image selected from among a plurality of images included in a video displayed in a display unit based on composite video data acquired by the appended data display unit.

19. The program according to any of Items 11-18, for causing the computer to execute procedures of temporarily storing, in a storage unit, information of a plurality of images selected by the data transmission unit, present, to a user, information of the plurality of images in storage, and receiving a confirmation operation, and transmitting the information of the plurality of images, after the confirmation reception unit has received the confirmation operation.

20. The program according to any of Items 11-19, wherein the information processing device realized by the computer is a user mobile terminal or a server device communicable with the user mobile terminal.

The present application claims the priority of Japanese Patent Application No. 2012-164130 filed on Jul. 24, 2012, the entirety of which is incorporated herein.

The invention claimed is:

1. An information processing system comprising:
a memory storing instructions; and
one or more processors configured to execute the instructions to:
acquire image data which captures at least a part of an imaging target showing a plurality of items;
recognize that the image data contains registered data which is registered in advance;
extract a plurality of stored appended data matching a predetermined condition corresponding to the registered data; and
display the extracted appended data at a predetermined position in the image data, wherein the predetermined position corresponds to the registered data.

2. The information processing system according to claim 1, wherein the one or more processors are further configured to execute the instructions to
acquire attribute information related to a user, and
extract the appended data based on the predetermined condition or based on the attribute information of the user.

3. The information processing system according to claim 2, wherein the attribute information of the user includes allergy information, and the one or more processors are further configured to execute the instructions to:
store, as the appended data, allergic substance information,
extract the allergic substance information corresponding to the allergy information of the user, for the recognized registered data, and
display a predetermined display element at a position corresponding to the registered data for which the allergic substance information is extracted.

4. The information processing system according to claim 2, wherein the one or more processors are further configured to execute the instructions to change visibility of the appended data according to the attribute information of the user.

5. The information processing system according to claim 1, wherein the appended data includes any combination of recommendation information, discount information, coupon information, allergy information, ratings information, or option service information corresponding to the registered data.

6. The information processing system according to claim 1, wherein the one or more processors are further configured to execute the instructions to transmit information corresponding to an image selected from a plurality of displayed images.

7. The information processing system according to claim 6, wherein the one or more processors are further configured to execute the instructions to:
temporarily store the information of the selected image, display the information of the stored images, receive a confirmation operation,
and transmit the information of the selected image after receiving the confirmation operation.

8. The information processing system according to claim 1, wherein the information processing system is a user mobile terminal or a server device communicable with the user mobile terminal.

9. A data processing method performed by an information processing system, the method comprising:
sequentially acquiring image data which captures at least a part of an imaging target showing a plurality of items;
recognizing that the image data contains registered data which is registered in advance;
extracting a plurality of stored appended data matching a predetermined condition corresponding to the registered data; and
displaying the extracted appended data at a predetermined position in the image data, wherein the predetermined position corresponds to registered data.

10. A non-transitory computer readable medium including a memory storing a program that, when executed by a processor, causes the processor to perform a method, the method comprising:
sequentially acquiring image data which captures at least a part of an imaging target showing a plurality of items;
recognizing that the image data contains registered data which is registered in advance;
extracting a plurality of stored appended data matching a predetermined condition corresponding to the registered data; and
displaying the extracted appended data at a predetermined position in the image data, wherein the predetermined position corresponds to the registered data.

11. The data processing method of claim 9, further comprising acquiring attribute information related to a user, and extracting the appended data based on the predetermined condition or based on the attribute information of the user.

12. The data processing method of claim 9, further comprising:
storing, as the appended data, allergic substance information, extracting the allergic substance information corresponding to the allergy information of the user for the recognized registered data, and
displaying a predetermined display element at a position corresponding to the registered data for which the allergic substance information is extracted.

13. The data processing method of claim 9, further comprising changing visibility of the appended data according to the attribute information of the user.

14. The data processing method of claim 9, wherein the appended data includes any combination of recommendation information, discount information, coupon information, allergy information, ratings information, or option service information corresponding to the registered data.

15. The data processing method of claim 9, further comprising transmitting information corresponding to an image selected from a plurality of displayed images.

16. The data processing method of claim 9, further comprising temporarily storing the information of the selected image, displaying information of the stored images, receiving a confirmation operation, and transmitting the information of the selected image after receiving the confirmation operation.

17. The data processing method of claim 9, wherein the information processing system is a user mobile terminal or a server device communicable with the user mobile terminal.

18. The non-transitory computer-readable medium of claim 10, further comprising acquiring attribute information related to a user, and extracting the appended data based on a predetermined condition or based on the attribute information of the user.

* * * * *